United States Patent
Nishikawa et al.

(10) Patent No.: US 11,022,003 B2
(45) Date of Patent: Jun. 1, 2021

(54) STEAM TURBINE EXHAUST CHAMBER AND STEAM TURBINE SYSTEM

(71) Applicant: MITSUBISHI HEAVY INDUSTRIES, LTD., Tokyo (JP)

(72) Inventors: Toyoharu Nishikawa, Tokyo (JP); Hideaki Sugishita, Tokyo (JP); Kazuyuki Matsumoto, Tokyo (JP); Yoshihiro Kuwamura, Tokyo (JP); Kei Nakanishi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 145 days.

(21) Appl. No.: 16/273,364

(22) Filed: Feb. 12, 2019

(65) Prior Publication Data
US 2019/0277163 A1    Sep. 12, 2019

(30) Foreign Application Priority Data
Mar. 8, 2018    (JP) .............................. JP2018-041703

(51) Int. Cl.
*F01D 25/30* (2006.01)
*F01D 13/02* (2006.01)
(Continued)

(52) U.S. Cl.
CPC ............. *F01D 25/30* (2013.01); *F01D 13/02* (2013.01); *F01D 17/08* (2013.01); *F01D 25/14* (2013.01);
(Continued)

(58) Field of Classification Search
CPC . F02C 9/18; F01D 25/24; F01D 25/14; F01D 25/30; F01D 17/08; F01D 13/02;
(Continued)

(56) References Cited

U.S. PATENT DOCUMENTS 5,209,634 A * 5/1993 Owczarek ............... F01D 25/30
                                                            415/150
5,621,654 A * 4/1997 Cohen ..................... F01K 13/02
                                                            700/287
(Continued)

FOREIGN PATENT DOCUMENTS

JP    S56-157787 A    12/1981
JP    S57-202701 U    12/1982
(Continued)

OTHER PUBLICATIONS

Office Action dated Feb. 4, 2020, issued in counterpart JP Application No. 2018-041703, with English translation. (6 pages).
(Continued)

*Primary Examiner* — J. Todd Newton
*Assistant Examiner* — Andrew J Marien
(74) *Attorney, Agent, or Firm* — Westerman, Hattori, Daniels & Adrian, LLP

(57) ABSTRACT

A steam turbine exhaust chamber defining therein an exhaust passage through which steam having passed through a last-stage blade of a steam turbine is introduced to a condenser includes: a casing including an outer peripheral wall portion formed on an outer peripheral side of the exhaust passage; a bearing cone disposed on a radially inner side of the outer peripheral wall portion; and at least one bypass passage carrying a part of steam flowing through the exhaust passage from a high-pressure portion of the exhaust passage to a low-pressure portion of the exhaust passage or to the condenser, The at least one bypass passage includes a high-pressure-side opening formed in the bearing cone and a low-pressure-side opening facing steam having a lower pressure than steam facing the high-pressure-side opening.

17 Claims, 26 Drawing Sheets

(51) Int. Cl.
*F02C 9/18* (2006.01)
*F01D 25/24* (2006.01)
*F01D 25/14* (2006.01)
*F01D 17/08* (2006.01)

(52) U.S. Cl.
CPC .............. *F01D 25/24* (2013.01); *F02C 9/18* (2013.01); *F05D 2220/31* (2013.01); *F05D 2270/17* (2013.01)

(58) Field of Classification Search
CPC ............... F01D 17/05; F05D 2220/31; F05D 2260/606; F05D 2270/17
See application file for complete search history.

(56) References Cited

U.S. PATENT DOCUMENTS

| | | | | |
|---|---|---|---|---|
| 6,419,448 | B1 * | 7/2002 | Owczarek | F01D 1/02 415/207 |
| 2004/0055273 | A1 * | 3/2004 | Hirayama | F02C 9/32 60/39.281 |
| 2016/0090861 | A1 * | 3/2016 | Shibukawa | F01D 19/00 415/177 |
| 2016/0125965 | A1 * | 5/2016 | Mikami | F28B 1/02 60/660 |

FOREIGN PATENT DOCUMENTS

| | | |
|---|---|---|
| JP | H04-116605 U | 10/1992 |
| JP | H10-169409 A | 6/1998 |
| JP | 11-200814 A | 7/1999 |
| JP | 2004-150357 A | 5/2004 |
| JP | 2006-83801 A | 3/2006 |
| JP | 2006-329148 A | 12/2006 |
| JP | 2011-220125 A | 11/2011 |

OTHER PUBLICATIONS

Office Action dated Jul. 7, 2020, issued in counterpart JP Application No. 2018-041703, with English translation (8 pages).

\* cited by examiner

OPPOSITE SIDE ←→ CONDENSER SIDE

STEAM TURBINE EXHAUST CHAMBER AND STEAM TURBINE SYSTEM

TECHNICAL FIELD

The present disclosure relates to a steam turbine exhaust chamber defining therein an exhaust passage through which steam having passed through a last-stage blade of a steam turbine is introduced to a condenser, a steam turbine, and a steam turbine system including a boiler and a generator.

BACKGROUND ART

Generally, steam (exhaust gas) used in a turbine of a steam turbine and passing through a last-stage blade flows through an exhaust passage in an exhaust chamber and then is condensed by a condenser. The pressure of steam flowing through the exhaust passage is recovered as the speed of its flow decreases during passage through a diffuser passage in the exhaust chamber. As the pressure recovery amount increases in the exhaust chamber, the pressure differential between the condenser and the last-stage blade increases, and the pressure of the last-stage blade outlet decreases. This increases the output power of the turbine and increases the turbine efficiency. The pressure recovery in the exhaust chamber is affected by the property of the flow of steam flowing through the exhaust chamber and the shape of structures inside the exhaust chamber. In view of this, some configurations have been suggested to improve the turbine efficiency.

For instance, Patent Document 1 discloses a steam turbine including a deflection member disposed on a flow guide which forms a diffuser passage of an exhaust chamber, so that swirl is imparted to a tip flow in the diffuser passage to reduce loss caused when the tip flow is mixed with a steam main flow.

Patent Document 2 discloses an exhaust device for a steam turbine which discharges steam downward from an exhaust chamber. In this exhaust device, a steam passage formed by a flow guide on the outer peripheral side and a bearing cone on the inner peripheral side in the exhaust chamber has an upstream portion and a downstream portion longer than the upstream portion.

CITATION LIST

Patent Literature

Patent Document 1: JP2011-220125A
Patent Document 2: JPH11-200814A

SUMMARY

Unfortunately, the steam turbine and the exhaust device for a steam turbine disclosed in Patent Documents 1 and 2 have a risk of reducing the efficiency of the steam turbine due to environmental changes. More specifically, the pressure in a condenser varies due to environmental changes such as change in season or change in temperature. The variation in pressure of the condenser changes the flow of steam inside an exhaust chamber. Especially in case of high temperature, the pressure inside the condenser increases (becomes low degree of vacuum), and thus the flow of steam flowing through the exhaust chamber becomes turbulent. When the flow of steam flowing through the exhaust chamber becomes turbulent, for instance, the pressure of steam on the inner surface of the bearing cone increases, and steam flowing through the exhaust passage is separated from the bearing cone which covers the inner peripheral surface of the diffuser passage, which can significantly reduce the pressure recovery performance in the exhaust chamber. Thus, when the flow of steam flowing through the exhaust chamber becomes turbulent, fluid loss can increase in the exhaust chamber, which reduces the efficiency of the steam turbine.

In view of the above, an object of at least one embodiment of the present invention is to provide a steam turbine exhaust chamber and a steam turbine system whereby it is possible to reduce fluid loss in an exhaust chamber and it is possible to improve the efficiency of the steam turbine.

(1) According to at least one embodiment of the present invention, a steam turbine exhaust chamber defining therein an exhaust passage through which steam having passed through a last-stage blade of a steam turbine is introduced to a condenser comprises: a casing including an outer peripheral wall portion formed on an outer peripheral side of the exhaust passage; a bearing cone disposed on a radially inner side of the outer peripheral wall portion; and at least one bypass passage carrying a part of steam flowing through the exhaust passage from a high-pressure portion of the exhaust passage to a low-pressure portion of the exhaust passage or to the condenser. The at least one bypass passage includes a high-pressure-side opening formed in the bearing cone and a low-pressure-side opening facing steam having a lower pressure than steam facing the high-pressure-side opening.

According to the above configuration (1), the steam turbine exhaust chamber includes the casing including the outer peripheral wall portion formed on the outer peripheral side of the exhaust passage, the bearing cone disposed on the radially inner side of the outer peripheral wall portion, and at least one bypass passage carrying a part of steam flowing through the exhaust passage from a high-pressure portion of the exhaust passage to a low-pressure portion of the exhaust passage or to the condenser. The bypass passage includes the high-pressure-side opening formed in the bearing cone and the low-pressure-side opening facing steam having a lower pressure than steam facing the high-pressure-side opening. In such a steam turbine exhaust chamber, the bypass passage including the high-pressure-side opening formed in the bearing cone creates a forward flow adjacent to the bearing cone in the exhaust passage and thereby prevents separation of steam from the inner surface of the bearing cone. Thus, it is possible to increase the effective exhaust gas area in the exhaust chamber, and it is possible to improve the pressure recovery amount of steam in the exhaust chamber. Thus, the above-described steam turbine exhaust chamber can reduce fluid loss in the exhaust chamber and improve the efficiency of the steam turbine.

(2) In some embodiments, in the above configuration (1), the low-pressure-side opening is formed in the bearing cone upstream of the high-pressure-side opening in a flow direction, and when the steam turbine exhaust chamber is divided in a circumferential direction into a condenser side adjacent to the condenser and another side opposite to the condenser side apart from the condenser, the high-pressure-side opening is formed on the another side (hereinafter, referred to as "opposite side"), and the low-pressure-side opening is formed on the condenser side.

In the above configuration (2), the condenser side and the opposite side of the steam turbine exhaust chamber have different structures; i.e., on the opposite side, steam flowing adjacent to the bearing cone collides with the outer peripheral wall portion of the casing and turns back, so that the steam adjacent to the bearing cone is difficult to flow, unlike on the condenser side. Thus, steam flowing on the opposite side has a higher pressure than steam flowing on the condenser side, and steam facing the inner surface of the bearing cone on the opposite side is easily separated from the inner surface of the bearing cone. In this context, when the high-pressure-side opening of the bypass passage is formed on the opposite side while the low-pressure-side opening is formed on the condenser side, a part of steam facing the inner surface of the bearing cone is caused to flow from the high-pressure-side opening formed in the bearing cone on the opposite side toward the low-pressure-side opening formed in the bearing cone on the condenser side. Thus, it is possible to form a forward flow along the inner surface of the bearing cone on the opposite side of the exhaust passage.

(3) In some embodiments, in the above configuration (1), the low-pressure-side opening is an axial end seal portion disposed upstream of the high-pressure-side opening in a flow direction of the bearing cone, and the axial end seal portion is formed between a base portion of the last-stage blade and an upstream end of the bearing cone in the flow direction.

With the above configuration (3), since the axial end seal portion is formed between the base portion of the last-stage blade and the upstream end of the bearing cone in the flow direction, steam in the vicinity of the axial end seal portion has a lower pressure than steam facing the inner surface on the upstream side of the bearing cone in the flow direction. Thus, the pressure difference between the low-pressure-side opening and the high-pressure-side opening can be increased. This enables steam to efficiently flow from the high-pressure-side opening of the bypass passage.

(4) In some embodiments, in the above configuration (3), when the steam turbine exhaust chamber is divided in a circumferential direction into a condenser side adjacent to the condenser and another side opposite to the condenser side apart from the condenser, the high-pressure-side opening of the at least one bypass passage is formed on the another side (opposite side).

As described above, steam flowing on the opposite side has a higher pressure than steam flowing on the condenser side, and thus steam facing the inner surface of the bearing cone on the opposite side is easily separated from the inner surface of the bearing cone. With the above configuration (4), since the high-pressure-side opening of the bypass passage is formed on the opposite side, a part of steam facing the inner surface of the bearing cone on the opposite side flows from the high-pressure-side opening toward the low-pressure-side opening. Thus, it is possible to form a forward flow along the inner surface of the bearing cone on the opposite side of the exhaust passage. In particular, providing the high-pressure-side opening of the bypass passage only on the opposite side with a high pressure increases the pressure difference between the low-pressure-side opening and the high-pressure-side opening. This enables steam to efficiently flow from the high-pressure-side opening of the bypass passage.

(5) In some embodiments, in any one of the above configurations (1) to (4), the casing further includes an inner peripheral wall portion disposed on a radially inner side of the bearing cone, and at least a part of the at least one bypass passage is formed by an outer surface of the bearing cone and an inner surface of the inner peripheral wall portion.

With the above configuration (5), since the bearing cone serves as a lining of the inner peripheral wall portion of the casing, and the outer surface of the bearing cone and the inner surface of the inner peripheral wall portion together form at least a part of the bypass passage, it is possible to remove the bypass passage by exchange or processing of the bearing cone when the bypass passage is not required.

(6) In some embodiments, in the above configuration (1), the low-pressure-side opening is formed in the condenser.

In the above configuration (6), steam in the condenser has a lower pressure than steam in the vicinity of the axial end seal portion and than steam facing the inner surface on the upstream side of the bearing cone in the flow direction. Thus, the pressure difference between the low-pressure-side opening and the high-pressure-side opening can be increased. This enables steam to efficiently flow from the high-pressure-side opening of the bypass passage.

(7) In some embodiments, in any one of the above configurations (1) to (6), the steam turbine exhaust chamber further comprises a stop valve for opening and closing the at least one bypass passage.

With the above configuration (7), in a case where steam facing the inner surface of the bearing cone is likely to separate, opening the stop valve (increasing the degree of opening) causes a part of steam facing the inner surface of the bearing cone to flow through the bypass passage, which makes it possible to prevent separation of steam from the inner surface of the bearing cone. Further, in a case where steam facing the inner surface of the bearing cone is not likely to separate, closing the stop valve (decreasing the degree of opening) reduces fluid loss or pressure drop caused when a part of the steam flows through the bypass passage.

(8) According at least one embodiment of the present invention, a steam turbine system comprises: a steam turbine including the steam turbine exhaust chamber described in any of the above (1) to (7); a boiler for combusting a fuel to generate steam; a generator for generating electric power by the steam turbine; and a separation detection device for detecting separation of steam flowing through the exhaust passage.

With the above configuration (8), it is possible to detect separation of steam flowing through the exhaust passage by the separation detection device. Thus, for instance, by controlling the steam turbine or the boiler of the steam turbine system so that the separation detection device does not detect separation, it is possible to reduce fluid loss in the exhaust chamber and improve the efficiency of the steam turbine.

(9) In some embodiments, in the above configuration (8), the separation detection device includes a pressure sensor disposed on an inner surface of the bearing cone.

With the above configuration (9), it is possible to detect the pressure of steam facing the inner surface of the bearing cone by the pressure sensor. The pressure distribution in a case where steam is separated from the inner surface of the bearing cone differs from the pressure distribution in a case where steam is not separated. With this property, it is possible to detect separation of steam flowing through the exhaust passage from the inner surface of the bearing cone by the pressure sensor.

(10) In some embodiments, in the above configuration (8), the separation detection device includes a vibration detection device disposed on an outer surface of the bearing cone.

With the above configuration (10), it is possible to detect vibration of the bearing cone by the vibration detection device. In a case where steam is separated from the inner surface of the bearing cone, the flow of steam facing the inner surface of the bearing cone becomes turbulent, and the bearing cone largely vibrates, compared with a case where steam is not separated. With this property, it is possible to detect separation of steam flowing through the exhaust passage from the inner surface of the bearing cone by the vibration detection device. Further, the vibration detection device can be provided on the outer surface of the bearing cone, in contract to the pressure sensor which is disposed on the inner surface of the bearing cone. Thus, the vibration detection device is easy to install.

(11) In some embodiments, in the above configuration (8), the separation detection device includes an output detection device for detecting an output power of the generator.

With the above configuration (11), it is possible to detect the output power of the generator by the output detection device. In a case where steam is separated from the flow guide or the bearing cone, the efficiency of the steam turbine decreases, and the output power of the steam turbine and the output power of the generator decrease, compared with a case where steam is not separated. With this property, it is possible to detect separation of steam flowing through the exhaust passage by the output detection device. Further, the generator is generally equipped with the output detection device and thus eliminates the necessity of an additional device for detecting separation of steam. Thus, it is possible to prevent complication of the system configuration.

(12) In some embodiments, in the above configuration (8), the separation detection device includes a calculation device for calculating efficiency of the steam turbine based on a measurement result of a measurement tool provided to the steam turbine system.

With the above configuration (12), using the calculation device, it is possible to calculate the efficiency of the steam turbine based on a measurement result of the measurement tool disposed on the steam turbine system. As described above, in a case where steam is separated from the flow guide or the bearing cone, the efficiency of the steam turbine decreases, and the output power of the steam turbine and the output power of the generator decrease, compared with a case where steam is not separated. With this property, it is possible to detect separation of steam flowing through the exhaust passage by the calculation device. Further, use of the measurement tool generally disposed on the steam turbine eliminates the necessity of an additional device for detecting separation of steam. Thus, it is possible to prevent complication of the system configuration.

(13) In some embodiments, in any one of the above configurations (8) to (12), the steam turbine system further comprises: a storage device storing criterion data indicating a separation state and a non-separation state of the steam flowing through the exhaust passage obtained by computational fluid analysis; and a separation determination device determining whether the steam flowing through the exhaust passage is separated, based on the criterion data and a detection result of the separation detection device.

With the above configuration (13), using the criterion data obtained by computational fluid analysis stored in the storage device, it is possible to accurately detect separation of steam. Thus, even in a case where some separation detection devices such as the pressure sensor are broken, it is possible to detect separation of steam. Further, it is possible to reduce the number of the separation detection devices while keeping detection accuracy regarding separation of steam.

(14) In some embodiments, in any one of the above configurations (8) to (13), the steam turbine system further comprises a separation prevention device for preventing separation of the steam flowing through the exhaust passage. The separation prevention device includes a controller for controlling an opening and closing operation of a main steam valve of the steam turbine or adjusting an amount of a fuel to be input to the boiler, based on a detection result of the separation detection device.

With the above configuration (14), in a case where separation of steam flowing through the exhaust passage is detected, the controller opens the main steam valve of the steam turbine (increases the opening degree) or increases the amount of fuel to be input to the boiler compared to during normal operation, so that the main steam flow rate of the steam turbine temporarily increases. When the main steam flow rate of the steam turbine increases, steam flows into the exhaust passage at a high flow rate, and thus steam flowing in the vicinity of the bearing cone adheres to the inner surface of the bearing cone. Thus, it is possible to prevent separation of steam flowing through the exhaust passage. Further, in a case where separation of steam flowing through the exhaust passage is not detected, the controller closes the main steam valve of the steam turbine (decreases the opening degree) or decreases the amount of fuel to be input to the boiler compared to a case where separation of steam is detected, so that the combustion efficiency of the steam turbine is improved. The adjustment of the input amount to the boiler is more effective in increasing the main steam flow rate of the steam turbine over a prolonged period, than the opening and closing operation of the main steam valve.

Further, separation of steam is affected by preceding operational conditions. For instance, if the turbine enters normal operation after steam is separated under an operational condition with low flow rate or low vacuum, steam is kept in the separation state; in contrast, if the turbine enters normal operation after steam adheres to the inner surface of the bearing cone under an operational condition with high flow rate or high vacuum, steam is kept in the non-separation state. Using this property, the controller can close the main steam valve of the steam turbine (decreases the opening degree) or decrease the amount of fuel to be input to the boiler, so that the combustion efficiency of the steam turbine is improved.

(15) In some embodiments, in any one of the above configurations (8) to (13), the steam turbine system further comprises a separation prevention device for preventing separation of the steam flowing through the exhaust passage. The separation prevention device includes a controller for controlling an opening and closing operation of a stop valve for opening and closing the at least one bypass passage.

With the above configuration (15), in a case where separation of steam flowing through the exhaust passage is detected, the controller opens the stop valve for opening and closing the bypass passage (increases the degree of opening) to cause a part of steam facing the inner surface of the bearing cone to flow through the bypass passage, which makes it possible to prevent separation of steam from the inner surface of the bearing cone. Further, in a case where separation of steam flowing through the exhaust passage is not detected, the controller closes the stop valve (decreases the degree of opening) to reduce fluid loss or pressure drop caused when a part of the steam flows through the bypass passage.

According to at least one embodiment of the present invention, there is provided a steam turbine exhaust chamber and a steam turbine system whereby it is possible to reduce fluid loss in an exhaust chamber and it is possible to improve the efficiency of the steam turbine.

DETAILED DESCRIPTION

Figure 1:
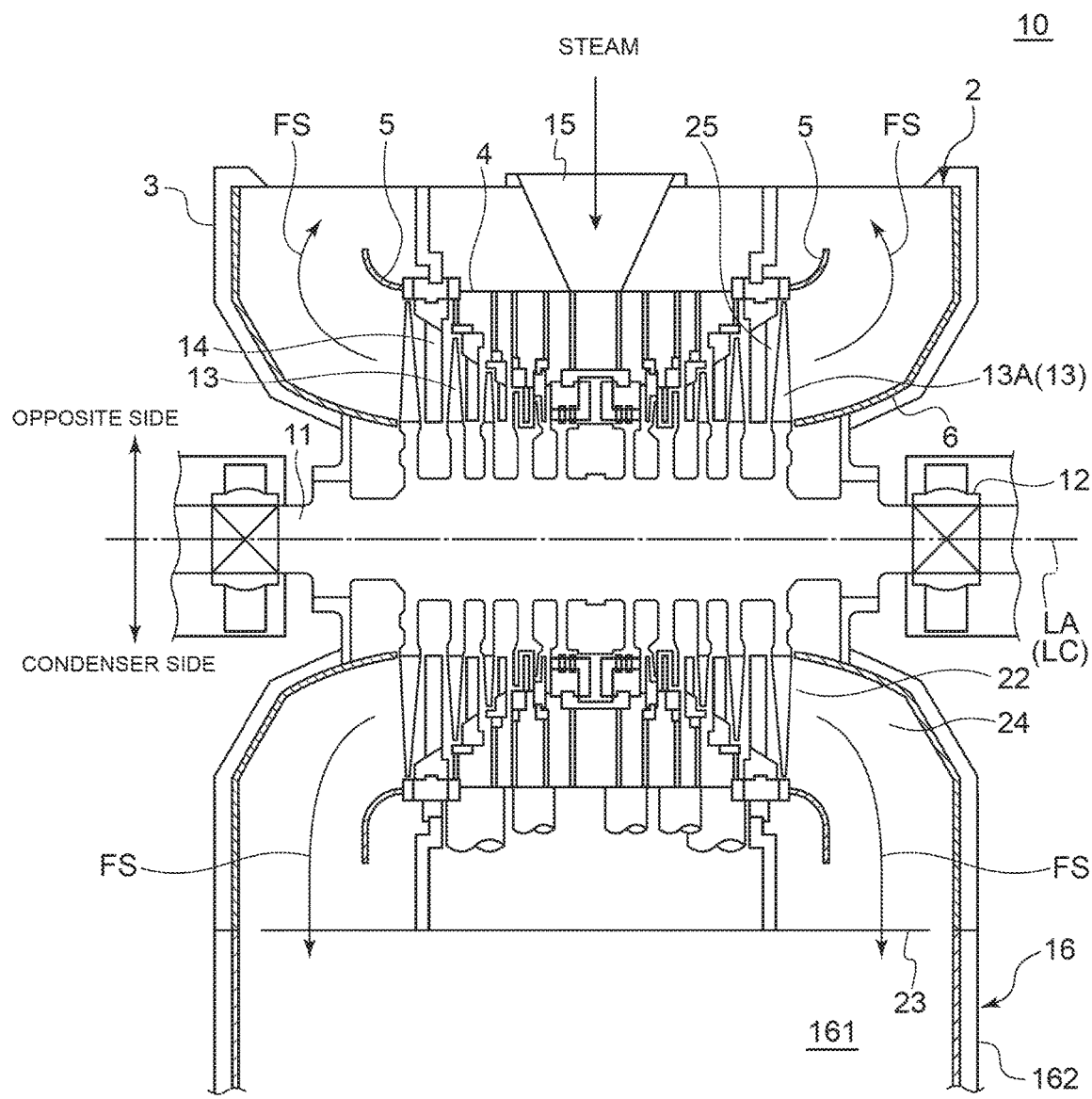
FIG. 1 is a schematic cross-sectional view of a steam turbine including an exhaust chamber according to an embodiment of the present invention, taken along the axial direction of the steam turbine.

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

First, an overall configuration of a steam turbine including a steam turbine exhaust chamber according to some embodiments will be described. FIG. 1 is a schematic cross-sectional view of a steam turbine including an exhaust chamber according to an embodiment of the present invention, taken along the axial direction of the steam turbine. As shown in FIG. 1, the steam turbine 10 includes an elongated rod-like rotor 11, a bearing 12 rotatably supporting the rotor 11, a plurality of blades 13 disposed on the rotor 11, an inner casing 4 accommodating the rotor 11 and the blades 13, a plurality of vanes 14 disposed on the inner casing 4 so as to face the blades 13, and an outer casing 3 disposed radially outside the inner casing 4. In this steam turbine 10, steam introduced into the inner casing 4 from a steam inlet 15 is expanded and accelerated as the steam passes through the vanes 14. This steam acts on the blades 13 to rotate the rotor 11. As shown in FIG. 1, the axis LA of the steam turbine 10 may coincide with the central axis LC of the rotor 11.

The steam turbine 10 includes an exhaust chamber 2. As shown in FIG. 1, the exhaust chamber 2 is disposed downstream of the blades 13 and the vanes 14. Steam (steam flow FS) having passed through the blades 13 and the vanes 14 in the inner casing 4 flows into the exhaust chamber 2 through an exhaust chamber inlet 22 disposed downstream of a last-stage blade 13A, which is a blade disposed on the most downstream side in the flow direction of steam. The steam then passes through an exhaust passage 21 formed inside the exhaust chamber 2, and is discharged through an exhaust chamber outlet 23 disposed on a downstream portion of the exhaust chamber 2 to the outside of the steam turbine 10. In the embodiment shown in FIG. 1, the exhaust chamber outlet 23 is across the central axis LC of the rotor 11 from the steam inlet 15. However, in other embodiments, the exhaust chamber outlet 23 and the steam inlet 15 may disposed on the same side of the central axis LC of the rotor 11, or may be spaced horizontally with respect to the central axis LC of the rotor 11.

In the embodiment shown in FIG. 1, a condenser 16 is disposed below the exhaust chamber 2. The condenser 16 includes a body 162 having a condenser inlet 161 through which steam enters from the exhaust chamber outlet 23 of the exhaust chamber 2, and a plurality of heat-transfer tubes (not shown) disposed inside the body 162. Cooling water cooled by seawater or the like flows in the heat-transfer tubes. In this case, steam flowing from the exhaust chamber outlet 23 of the exhaust chamber 2 via the condenser inlet 161 into the body 162 is condensed by the heat-transfer tubes into water.

Further, as shown in FIG. 1, the steam turbine 10 includes a bearing cone 6 disposed to cover the outer peripheral surface of the bearing 12 and a flow guide 5 disposed on the radially outer side of the bearing cone 6 in the exhaust chamber 2. The flow guide 5 and the bearing cone 6 are each formed in a cylindrical shape so that a distance from the axis LA of the steam turbine 10 increases downstream in the flow direction (outward in the axial direction). The flow guide 5 and the bearing cone 6 together form an annular diffuser passage 24 inside the exhaust chamber 2. The diffuser passage 24 communicates with a first inner space 25 disposed upstream of the last-stage blade 13A in the flow direction and has a shape whose cross-sectional area increases downstream in the flow direction. When the steam flow FS having passed through the last-stage blade 13A of the steam turbine 10 at high speed flows into the diffuser passage 24, the speed of the steam flow FS decreases, and kinetic energy of the steam is converted to pressure (static pressure recovery). As shown in FIG. 1, the central axes of the flow guide 5 and the bearing cone 6 may be on the same straight line as the central axis of the rotor 11. The steam turbine 10 may be a low-pressure turbine which receives steam used in a high-pressure turbine or an intermediate-pressure turbine.

Figure 2:
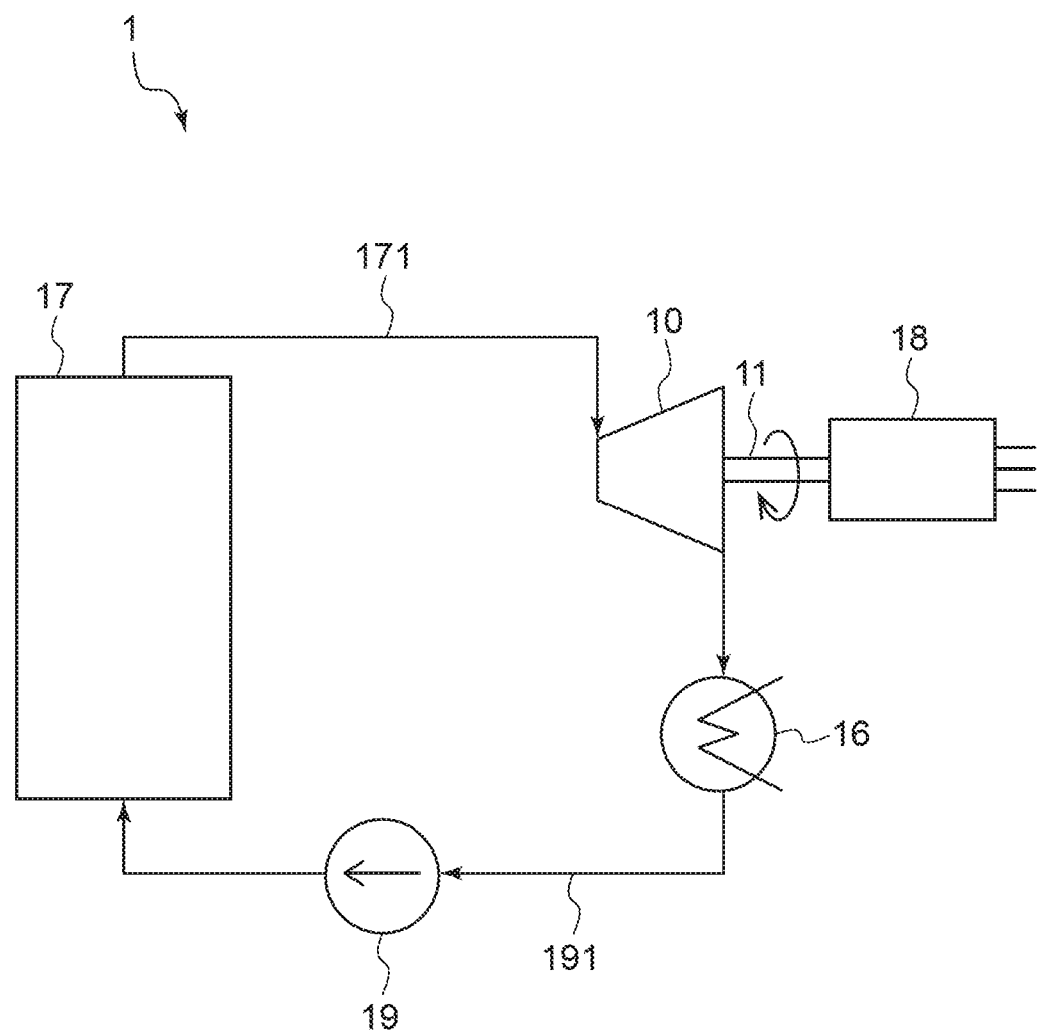
FIG. 2 is a schematic configuration diagram showing a configuration of a steam turbine plant according to an embodiment of the present invention.

Next, an overall configuration of a steam turbine system according to some embodiments will be described. FIG. 2 is a schematic configuration diagram showing a configuration of a steam turbine plant according to an embodiment of the present invention. As shown in FIG. 2, the steam turbine system 1 is for example used in a thermal power station and includes a boiler 17 combusting a fuel to generate steam (main steam), the above-described steam turbine 10 including the rotor 11 rotated by steam sent from the boiler 17, a generator 18 driven by rotation of the rotor 11 of the steam turbine 10, the above-described condenser 16 having therein the heat-transfer tubes cooled by seawater or the like and condensing steam with low pressure and temperature discharged from the steam turbine 10 by the heat-transfer tubes into water, and a water supply pump 19 supplying water generated by the condenser 16 to the boiler 17. Additionally, as shown in FIG. 2, the steam turbine system 1 further includes a steam inlet line 171 connected to the boiler 17 and the steam turbine 10 and supplying steam generated by the boiler 17 to the steam turbine 10, and a condensed water line 191 connected to the condenser 16 and the boiler 17 and provided with the water supply pump 19 disposed midway therebetween.

Figure 3:
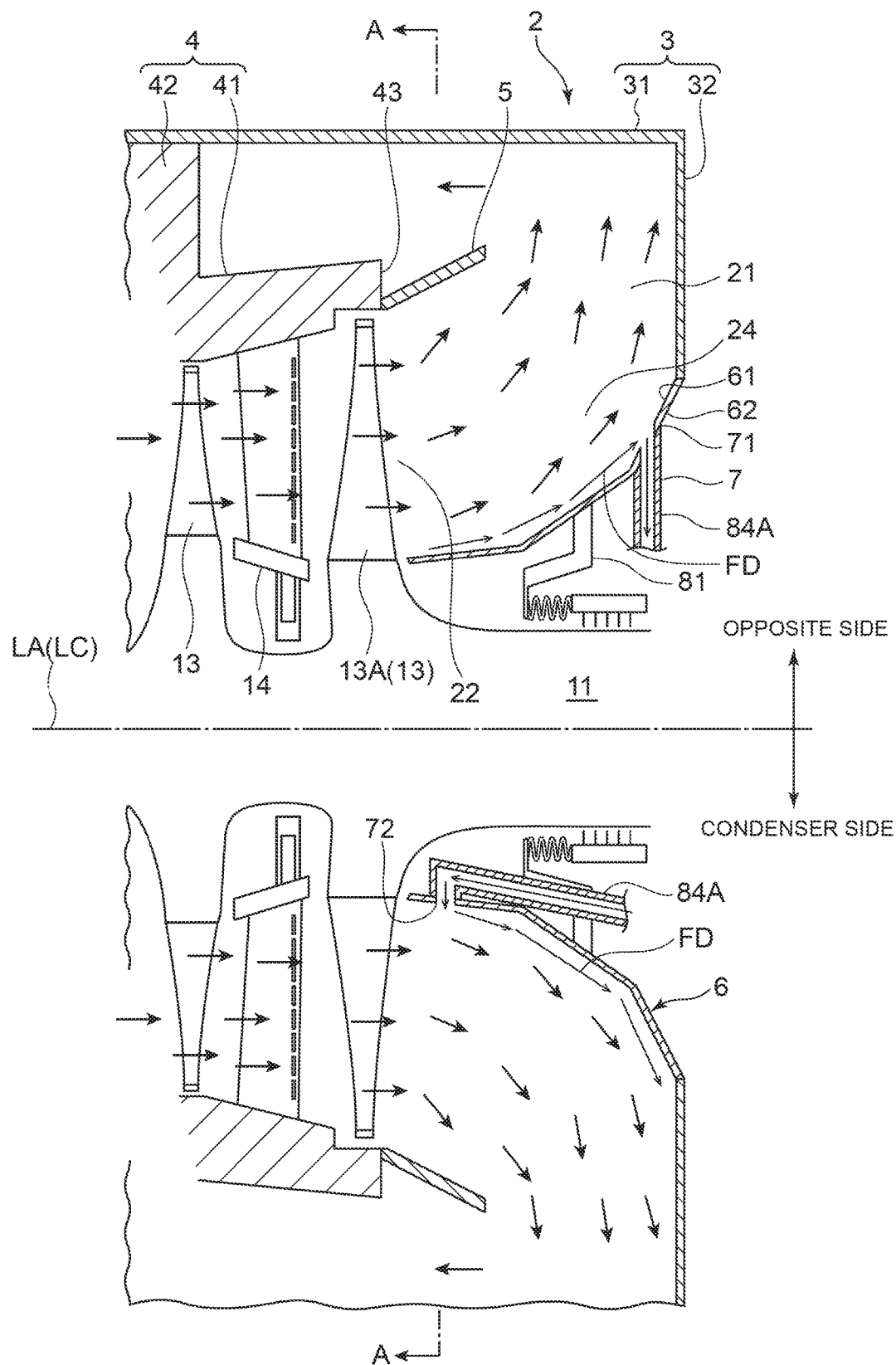
FIG. 3 is a cross-sectional view of an exhaust chamber of a steam turbine according to an embodiment of the present invention, taken along the axial direction.
Figure 4:
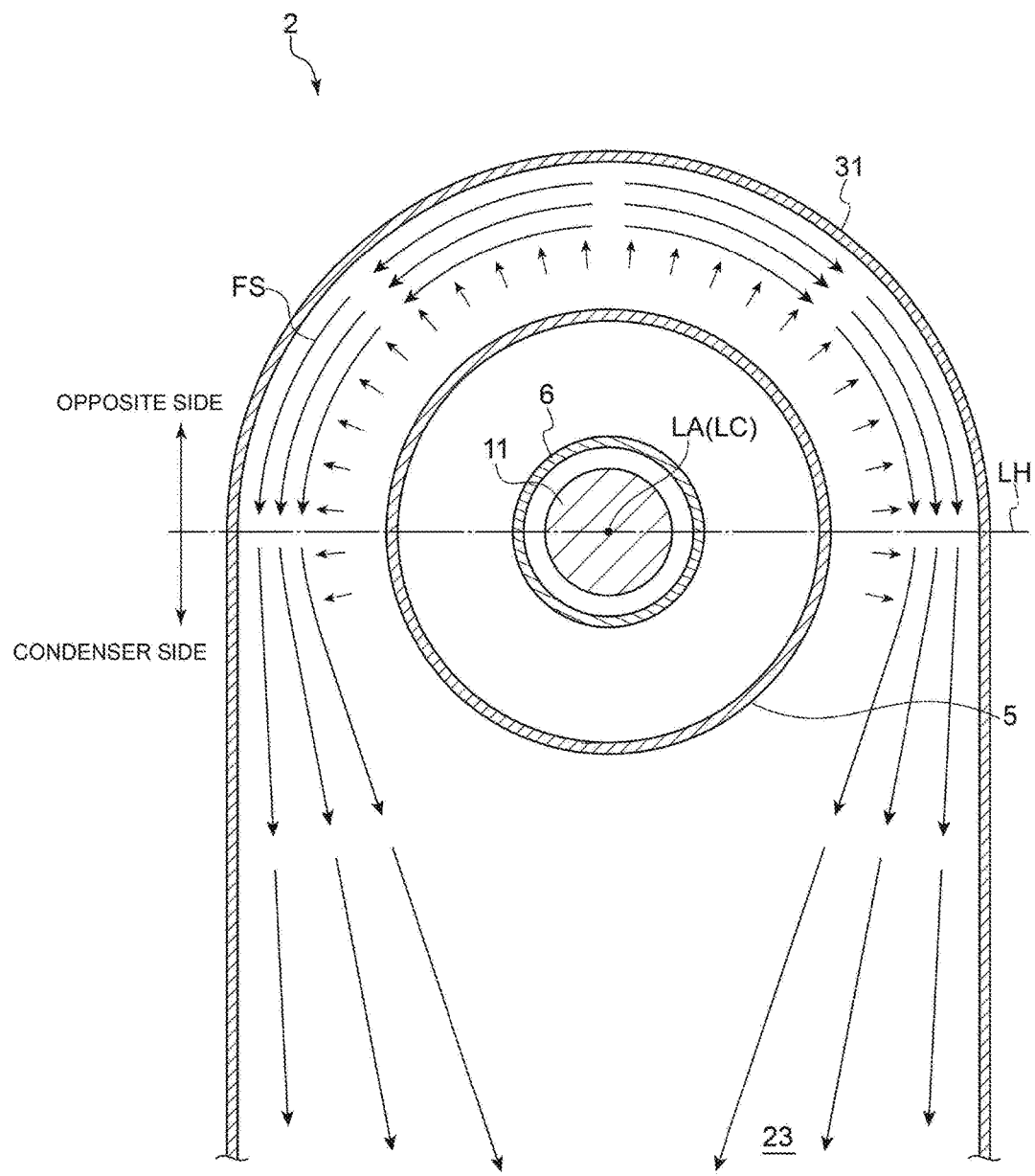
FIG. 4 is a schematic cross-sectional view taken along lines A-A in FIG. 3.
Figure 5:
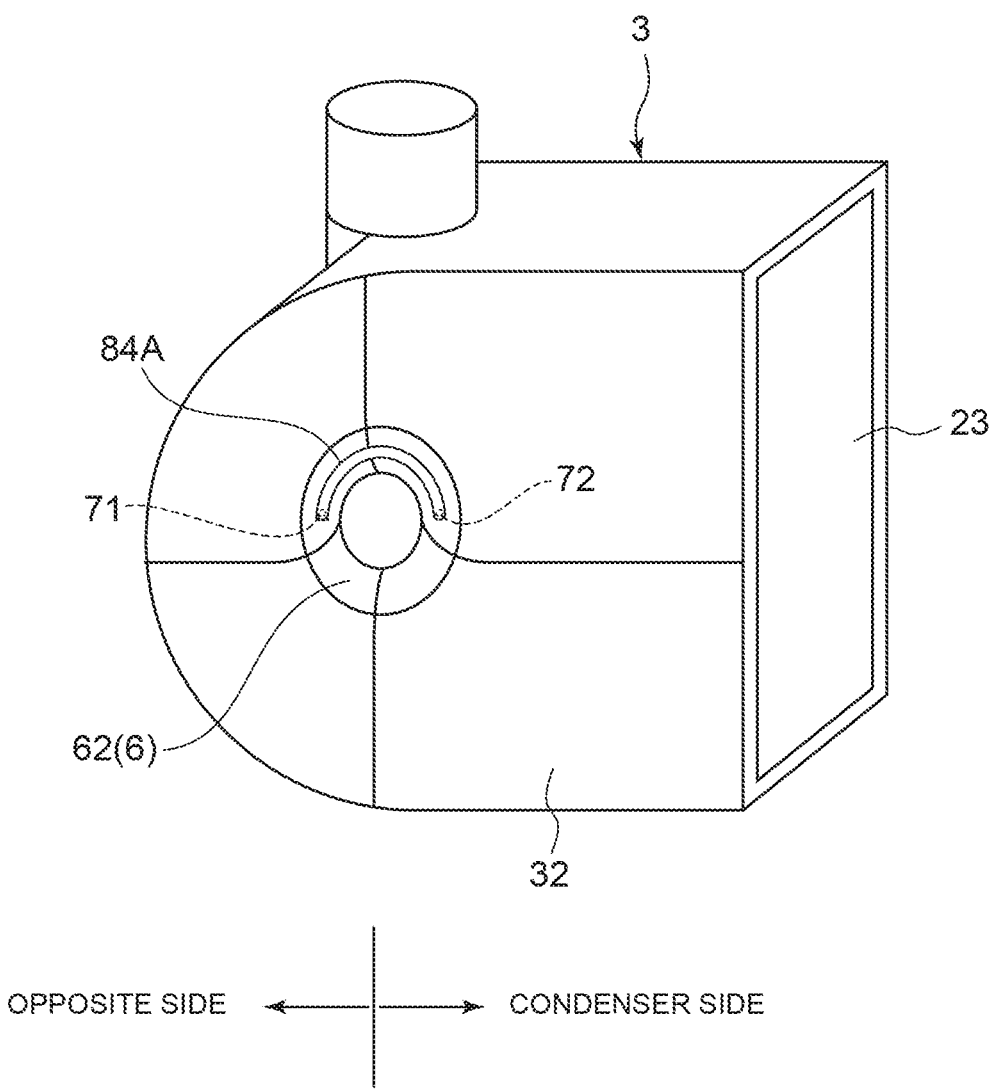
FIG. 5 is a schematic view of an exhaust chamber of a steam turbine according to an embodiment of the present invention, viewed from the axial direction.

Next, with reference to FIGS. 1 and 17, a configuration of the exhaust chamber 2 of the steam turbine 10 according to some embodiments will be described specifically. FIG. 3 is a cross-sectional view of an exhaust chamber of a steam turbine according to an embodiment of the present invention, taken along the axial direction. FIG. 4 is a schematic cross-sectional view taken along lines A-A in FIG. 3. FIG. 5 is a schematic view of an exhaust chamber of a steam turbine according to an embodiment of the present invention, viewed from the axial direction. In FIG. 5, a seal member 81 is not depicted.

As shown in FIG. 1, the exhaust chamber 2 of the steam turbine 10 according to some embodiments defines therein an exhaust passage 21 through which steam having passed through the last-stage blade 13A of the steam turbine 10 is introduced to the condenser 16. Further, as shown in FIG. 3, the exhaust chamber 2 includes an outer casing 3 (casing) including an outer peripheral wall portion 31 formed on the outer peripheral side of the exhaust passage 21, a bearing cone 6 disposed on the radially inner side of the outer peripheral wall portion 31, and at least one bypass passage 7 carrying a part of steam flowing through the exhaust passage 21 from a high-pressure portion of the exhaust passage 21 to a low-pressure portion of the exhaust passage 21 or to the condenser 16. The at least one bypass passage 7 includes, as shown in FIG. 3, a high-pressure-side opening 71 formed in the bearing cone 6 and a low-pressure-side opening 72 facing steam having a lower pressure than steam facing the high-pressure-side opening 71. Herein, the steam facing an opening or a surface means steam flowing in the vicinity of the opening or the surface, in an inner space (e.g., exhaust passage 21) facing or adjacent to the opening or the surface.

The outer casing 3 includes, as shown in FIG. 3, the outer peripheral wall portion 31 extending along the axial direction and a first wall portion 32 extending along the radial direction. A radially outer end (upper end in the figure) of the first wall portion 32 is connected to an axially outer end (right end in the figure) of the outer peripheral wall portion 31. As shown in FIG. 3, a radially inner end (lower end in the figure) of the first wall portion 32 is connected to a downstream end, with respect to the flow direction, of the bearing cone 6. While in the embodiment shown in FIG. 3, the bearing cone 6 has a multi-linear shape in a cross section along the axial direction, the bearing cone 6 may have an arc-shaped cross-section along the axial direction. In some embodiments, the downstream end of the bearing cone 6 in the flow direction may be connected to the axially outer end of the outer peripheral wall portion 31. Further, in some embodiments, the bearing cone 6 may be accommodated in the outer casing 3.

As shown in FIG. 4, the exhaust chamber 2 is divided in the circumferential direction into a condenser side adjacent to the exhaust chamber outlet 23 and the condenser 16 and another side opposite to the condenser side apart from the exhaust chamber outlet 23 and the condenser 16. In the embodiment shown in FIG. 4, a horizontal line LH divides the condenser side from the opposite side. The horizontal line LH is a straight line extending along the horizontal direction (right-left direction in FIG. 4) perpendicular to the axis passing through the central axis LC of the rotor 11. As shown in FIG. 4, the outer peripheral wall portion 31 has a semi-annular shape on the condenser side and extends along the vertical direction on the opposite side, in a cross-section along the horizontal line LH.

Further, as shown in FIG. 3, the inner casing 4 includes an inner peripheral wall portion 41 extending long the axial direction and a second wall portion 42 connected to an outer peripheral surface of the inner peripheral wall portion 41 and extending along the radial direction. The inner casing 4 is supported to the outer casing 3 via the second wall portion 42. While in the embodiment shown in FIG. 3, the flow guide 5 disposed on a downstream end 43 of the inner peripheral wall portion 41 in the flow direction has a single-linear shape in a cross-section along the axial direction, the flow guide 5 may have an arc-shaped or multi-liner cross-section along the axial direction.

In the embodiment shown in FIG. 3, at least one bypass passage 7 is formed by a cylindrical pipe 84A. As shown in FIG. 3, the pipe 84A has a first end connected to a downstream portion of the bearing cone 6 in the flow direction on the opposite side, so that a high-pressure-side opening 71 communicating with the exhaust passage 21 is formed in the downstream portion of the bearing cone 6 on the opposite side. Further, as shown in FIG. 3, the pipe 84A has a second end connected to an upstream portion of the bearing cone 6 in the flow direction on the condenser side, so that a low-pressure-side opening 72 communicating with the exhaust passage 21 is formed in the upstream portion of the bearing cone 6 on the condenser side. The pipe 84A penetrates a seal member 81. The seal member 81 seals between an outer surface 62 of the bearing cone 6 and the rotor 11 facing the outer surface 62. As shown in FIG. 5, the pipe 84A is formed in an arc shape along the outer surface 62 of the bearing cone 6 when viewed from the axial direction of the exhaust chamber 2. While in the embodiment shown in FIG. 3, the axis of the pipe 84A is bent midway, in other embodiments, the pipe 84A may be formed to have a liner or arc-shaped axis.

Figure 6:
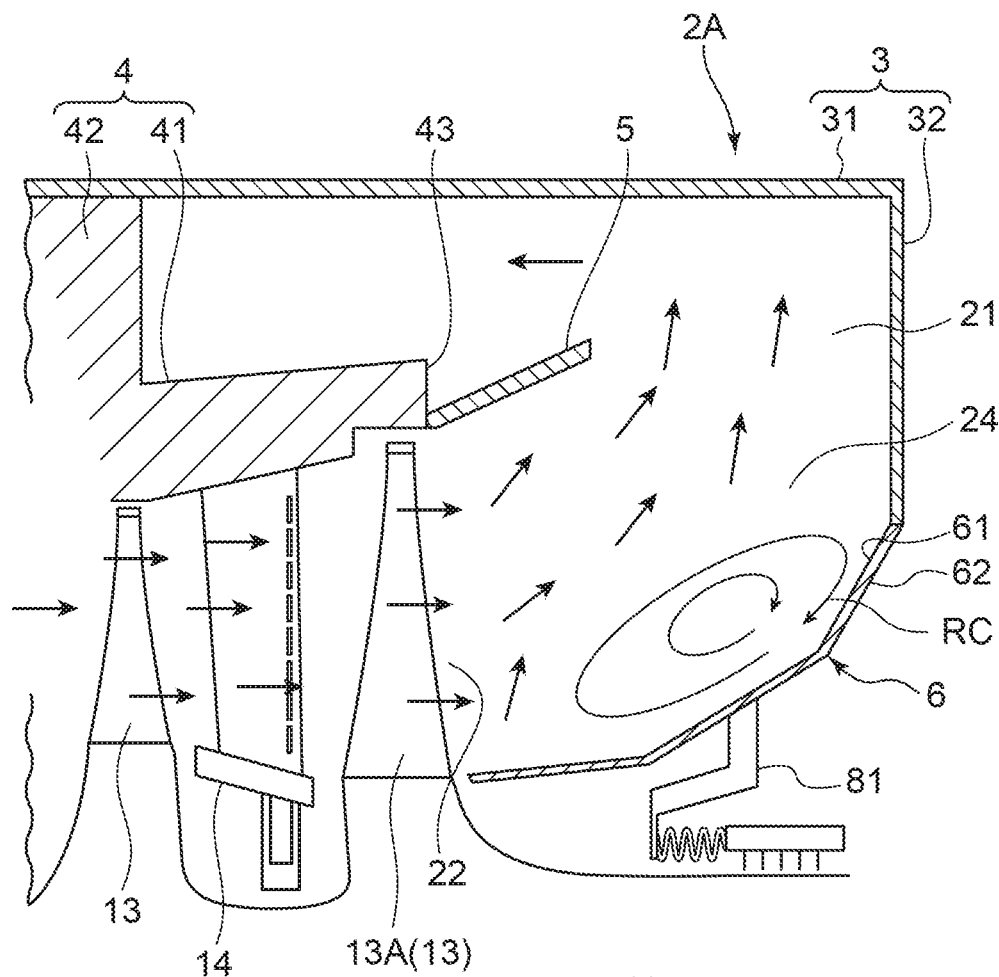
FIG. 6 is an enlarged cross-sectional view of a portion of an exhaust chamber of a steam turbine according to a comparative example, taken along the axial direction.

FIG. 6 is an enlarged cross-sectional view of a portion of an exhaust chamber of a steam turbine according to a comparative example, taken along the axial direction. In FIG. 6, members indicated by the same reference numerals as in the embodiment shown in FIG. 3 are not described. The exhaust chamber 2A in the comparative example shown in FIG. 6 includes the above-described outer casing 3 (casing) including the outer peripheral wall portion 31 and the above-described bearing cone 6, but does not include the above-described bypass passage 7. In this case, the efficiency of the steam turbine 10 can decrease as in the configurations disclosed in Patent Documents 1 and 2. More specifically, when the pressure in the condenser 16 increases (becomes low degree of vacuum) due to environmental changes or the like, the flow of steam flowing in the exhaust chamber 2 becomes turbulent. At this time, as shown in FIG. 6, a back flow RC in upstream direction along the bearing cone 6 can be formed. When the flow of steam flowing through the exhaust chamber 2 becomes turbulent, steam flowing through the exhaust passage 21 is separated from the bearing cone 6 which covers the inner peripheral surface of the diffuser passage 24, which can significantly reduce the pressure recovery performance in the exhaust chamber 2. Thus, when the flow of steam flowing in the exhaust chamber 2 becomes turbulent, fluid loss can increase in the exhaust chamber 2, which reduces the efficiency of the steam turbine 10.

In view of this, the present inventors have found that the bypass passage 7 including the high-pressure-side opening 71 formed in the bearing cone 6 creates a forward flow FD adjacent to the bearing cone 6 in the exhaust passage 21, thereby preventing separation of steam from the inner surface 61 of the bearing cone 6.

As described above, as shown in FIGS. 3 and 5 and FIGS. 7 to 17 described later, the exhaust chamber 2 of the steam turbine 10 according to some embodiments includes the above-described outer casing 3 (casing) including the outer peripheral wall portion 31, the above-described bearing cone 6, and the above-described at least one bypass passage 7 including the high-pressure-side opening 71 and the low-pressure-side opening 72.

According to the above configuration, the exhaust chamber 2 of the steam turbine 10 includes the outer casing 3 (casing) including the outer peripheral wall portion 31 formed on the outer peripheral side of the exhaust passage 21, the bearing cone 6 disposed on the radially inner side of the outer peripheral wall portion 31, and at least one bypass passage 7 carrying a part of steam flowing through the exhaust passage 21 from a high-pressure portion of the exhaust passage 21 to a low-pressure portion of the exhaust passage 21 or to the condenser 16. The bypass passage 7 includes the high-pressure-side opening 71 formed in the bearing cone 6 and the low-pressure-side opening 72 facing steam having a lower pressure than steam facing the high-pressure-side opening 71. In such an exhaust chamber 2 of the steam turbine 10, the bypass passage 7 including the high-pressure-side opening 71 formed in the bearing cone 6 creates a forward flow FD adjacent to the bearing cone 6 in the exhaust passage 21 and thereby prevents separation of steam from the inner surface 61 of the bearing cone 6. Thus, it is possible to increase the effective exhaust gas area in the exhaust chamber 2, and it is possible to improve the pressure recovery amount of steam in the exhaust chamber 2. Thus, the above-described exhaust chamber 2 of the steam turbine 10 can reduce fluid loss in the exhaust chamber 2 and improve the efficiency of the steam turbine 10.

Figure 7:
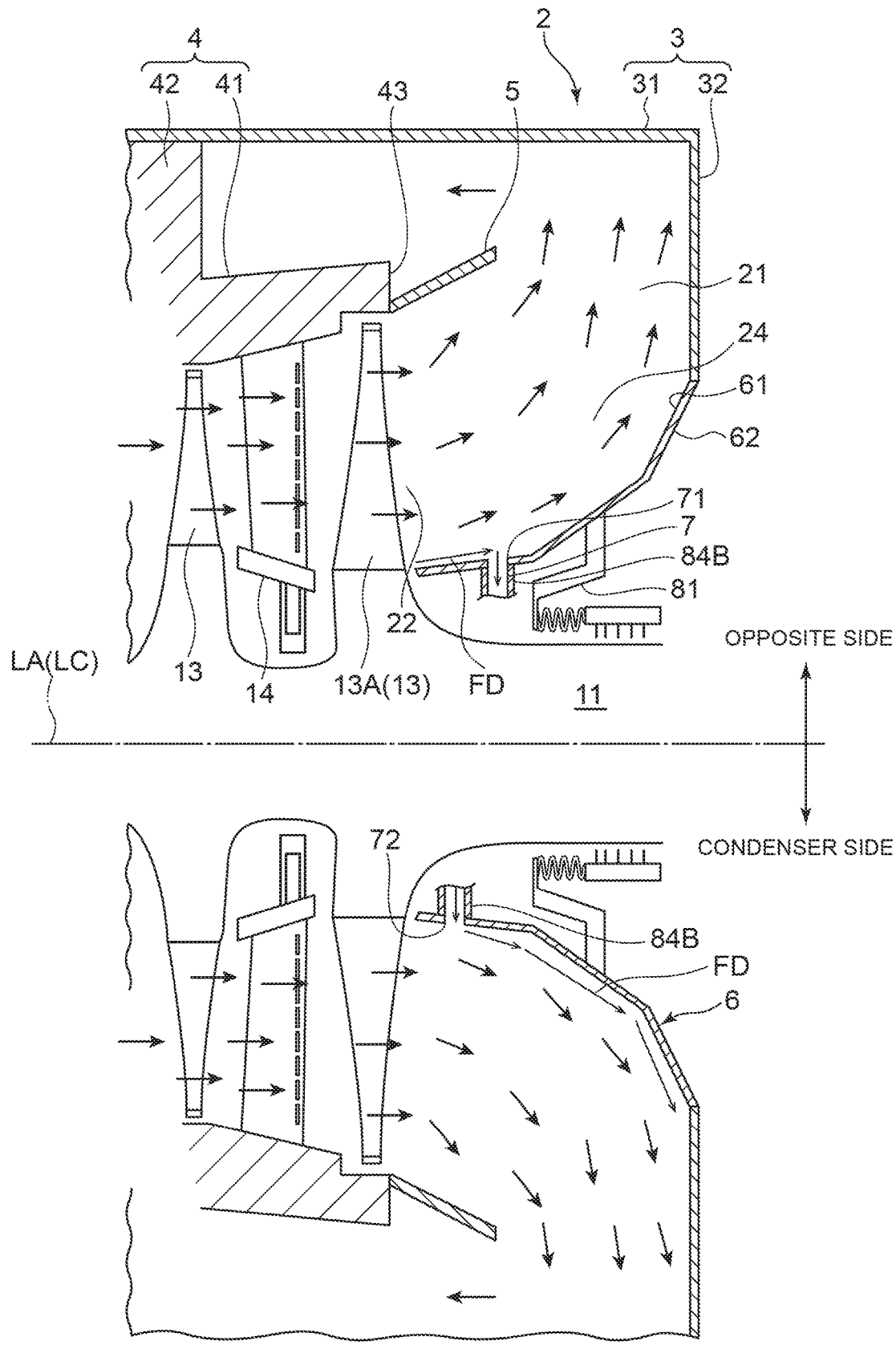
FIG. 7 is a cross-sectional view of an exhaust chamber of a steam turbine according to another embodiment of the present invention, taken along the axial direction.
Figure 14:
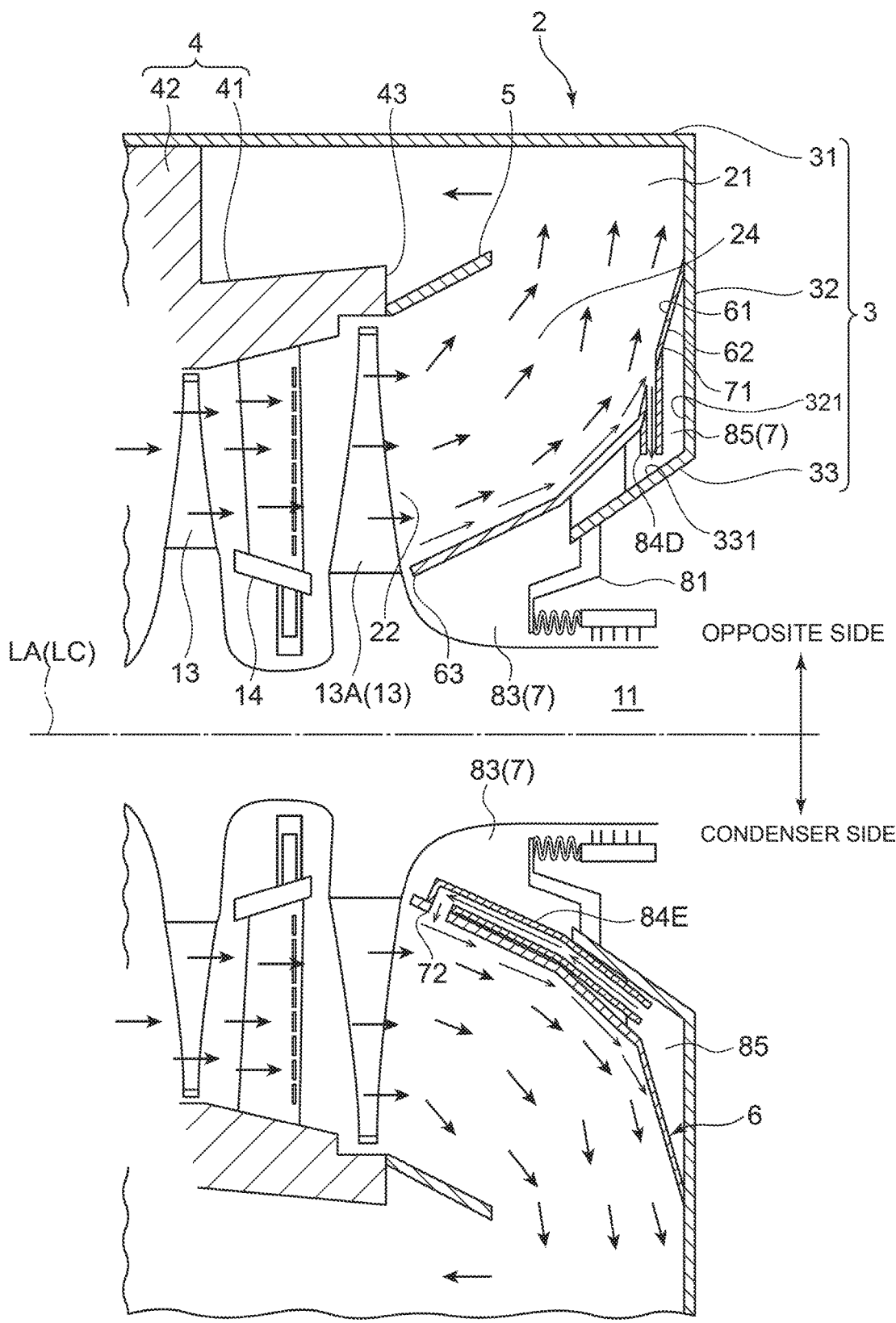
FIG. 14 is a cross-sectional view of an exhaust chamber of a steam turbine according to another embodiment of the present invention, taken along the axial direction, where a casing forms at least a part of a bypass passage.

FIG. 7 is a cross-sectional view of an exhaust chamber of a steam turbine according to another embodiment of the present invention, taken along the axial direction. In some embodiments, as shown in FIGS. 3 and 7 and FIG. 14 described later, the above-described low-pressure-side opening 72 is formed in the bearing cone 6 upstream of the high-pressure-side opening 71 in the flow direction. Further, as shown in FIGS. 3 and 7 and FIG. 14 described later, when the exhaust chamber 2 of the steam turbine 10 is divided in the circumferential direction into the condenser side adjacent to the condenser 16 and the side opposite to the condenser side apart from the condenser 16, the high-pressure-side opening 71 is formed on the opposite side, and the low-pressure-side opening 72 is formed on the condenser side.

In the embodiment shown in FIG. 7, at least one bypass passage 7 is formed by a cylindrical pipe 84B. As shown in FIG. 7, the pipe 84B has a first end connected to an upstream portion of the bearing cone 6 in the flow direction on the opposite side, so that a high-pressure-side opening 71 communicating with the exhaust passage 21 is formed in the upstream portion of the bearing cone 6 on the opposite side. Further, as shown in FIG. 7, the pipe 84B has a second end connected to an upstream portion of the bearing cone 6 in the flow direction on the condenser side, so that a low-pressure-side opening 72 communicating with the exhaust passage 21 is formed in the upstream portion of the bearing cone 6 on the condenser side. Further, the first and second ends of the pipe 84B are situated on the axially inner side of the seal member 81, so that the pipe 84B does not penetrate the seal member 81.

In the above configuration, the condenser side and the opposite side of the exhaust chamber 2 of the steam turbine 10 have different structures; i.e., on the opposite side, steam flowing adjacent to the bearing cone 6 collides with the outer peripheral wall portion 31 of the outer casing 3 and turns back, so that the steam adjacent to the bearing cone 6 is difficult to flow, unlike the condenser side. Thus, steam flowing on the opposite side has a higher pressure than steam flowing on the condenser side, and steam facing the inner surface 61 of the bearing cone 6 on the opposite side is easily separated from the inner surface 61 of the bearing cone 6. In this context, when the high-pressure-side opening 71 of the bypass passage 7 is formed on the opposite side while the low-pressure-side opening 72 is formed on the condenser side, a part of steam facing the inner surface 61 of the bearing cone 6 is caused to flow from the high-pressure-side opening 71 formed in the bearing cone 6 on the opposite side toward the low-pressure-side opening 72 formed in the bearing cone 6 on the condenser side. Thus, it is possible to form a forward flow FD along the inner surface 61 of the bearing cone 6 in the exhaust passage 21 on the opposite side. Further, steam passing through the bypass passage 7 and flowing from the low-pressure-side opening 72 formed in the bearing cone 6 on the condenser side into the exhaust passage 21 on the condenser side creates a forward flow FD along the inner surface 61 of the bearing cone 6 on the condenser side of the exhaust passage 21.

Figure 8:
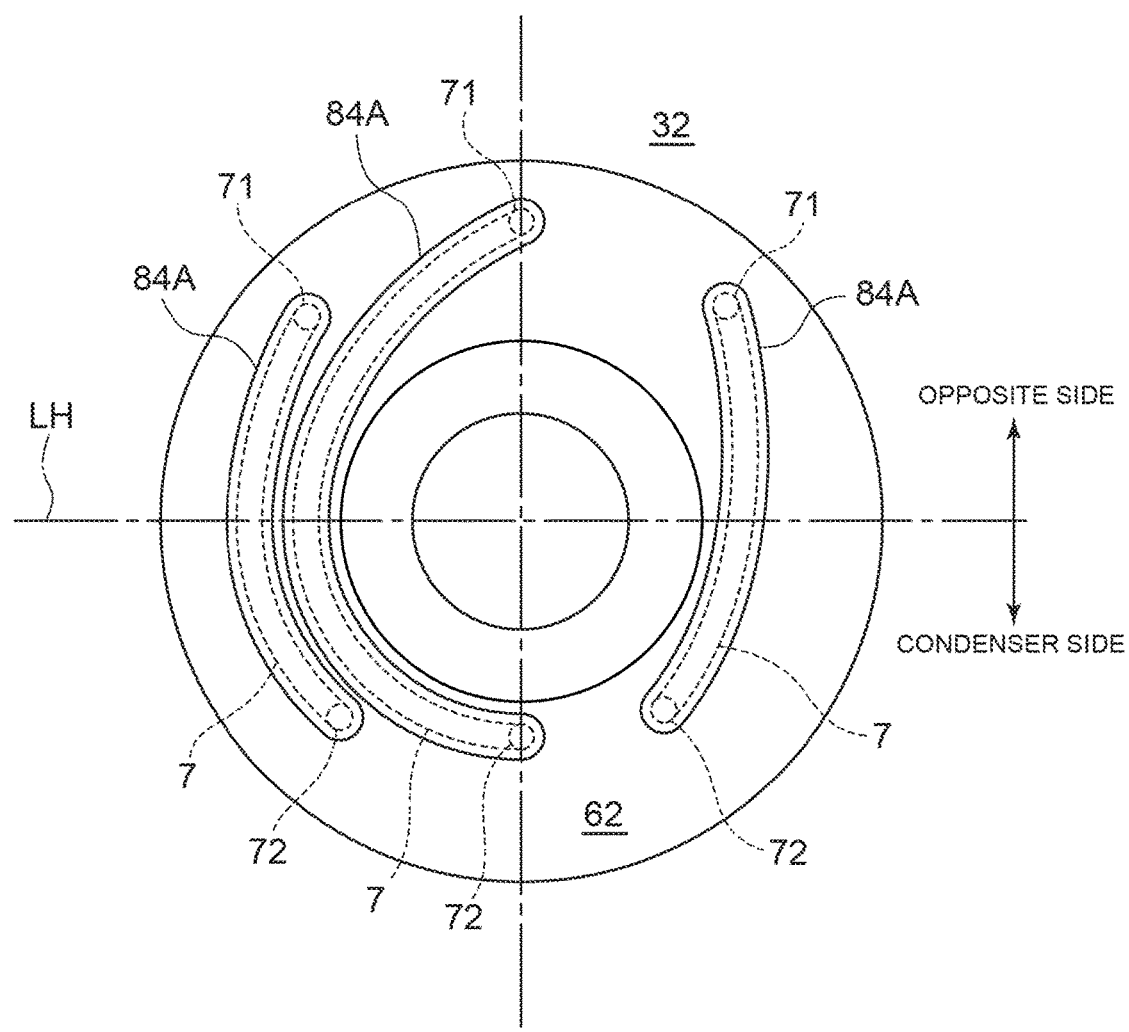
FIG. 8 is a schematic diagram for describing a bypass passage according to another embodiment of the present invention, viewed from the axial direction.

FIG. 8 is a schematic diagram for describing a bypass passage according to another embodiment of the present invention, viewed from the axial direction. In some embodiments, as shown in FIG. 8, the above-described exhaust chamber 2 includes a plurality of bypass passages 7 described above. Each of the plurality of bypass passages 7 includes one high-pressure-side opening 71 and one low-pressure-side opening 72. In this case, since the bypass passage 7 includes the high-pressure-side opening 71 and the low-pressure-side opening 72 communicating with the high-pressure-side opening 71, turbulence of flow of steam in the bypass passage 7 is reduced. Thus, steam can efficiently flow into the high-pressure-side opening 71 of the bypass passage 7.

Figure 9:
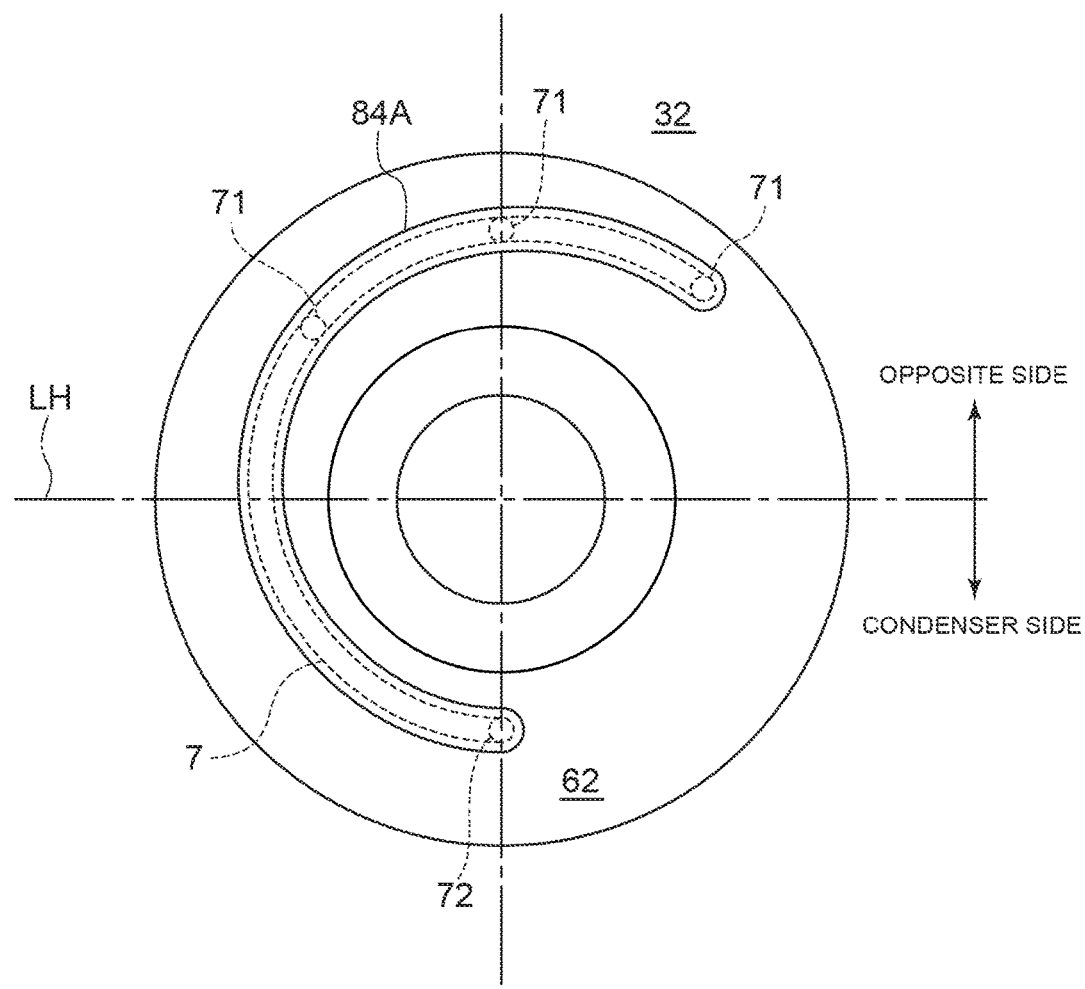
FIG. 9 is a schematic diagram for describing a bypass passage according to another embodiment of the present invention, viewed from the axial direction, where a single low-pressure-side opening is formed against a plurality of high-pressure-side openings.

FIG. 9 is a schematic diagram for describing a bypass passage according to another embodiment of the present invention, viewed from the axial direction, where a single low-pressure-side opening is formed against a plurality of high-pressure-side openings. In some embodiments, as shown in FIG. 9, the above-described bypass passage 7 includes a plurality of high-pressure-side openings 71 and a single low-pressure-side opening 72 communicating with each of the high-pressure-side openings 71. Thus, steam introduced from each of the high-pressure-side openings 71 flows through the bypass passage 7 and out of the low-pressure-side opening 72. In this case, it is possible to improve layout property compared with a case where multiple bypass passages 7 are provided. Further, among the high-pressure-side openings 71, a high-pressure-side opening 71 that faces steam with higher pressure let more steam into the bypass passage 7, which makes it possible to effectively rectify the flow of steam flowing adjacent to the bearing cone 6 in the exhaust passage 21.

Alternatively, in some embodiments, the above-described bypass passage 7 may include a plurality of low-pressure-side openings 72 and a single high-pressure-side opening 71 communicating with each of the low-pressure-side openings 72. In this case, it is possible to improve layout property compared with a case where multiple bypass passages 7 are provided. Further, among the low-pressure-side openings 72, a low-pressure-side opening 72 that faces steam with a lower pressure let more steam out of the bypass passage 7, which makes it possible to effectively rectify the flow of steam flowing adjacent to the bearing cone 6 in the exhaust passage 21.

Figure 10:
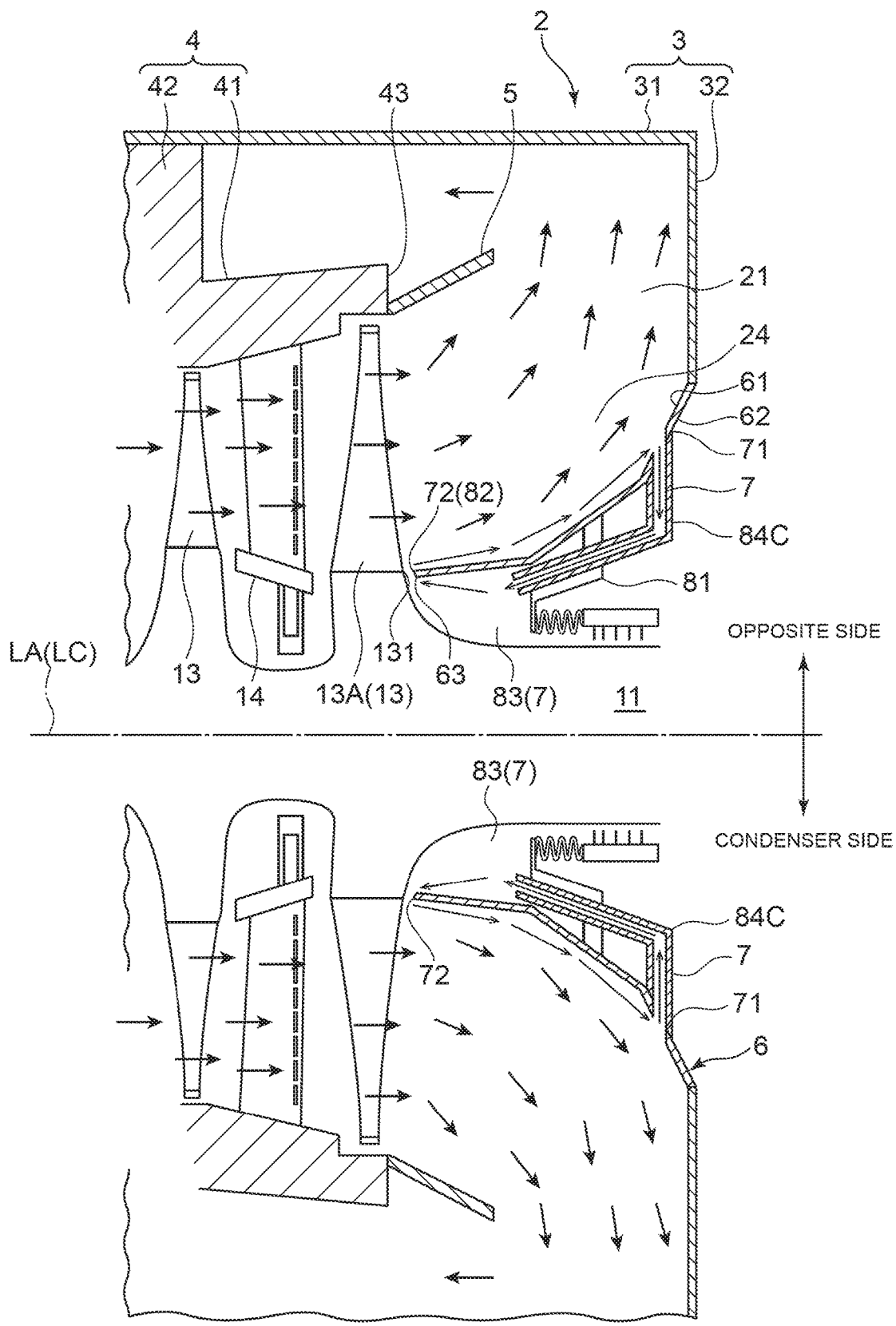
FIG. 10 is a cross-sectional view of an exhaust chamber of a steam turbine according to another embodiment of the present invention, taken along the axial direction, where an axial end seal portion forms a low-pressure-side opening.
Figure 11:
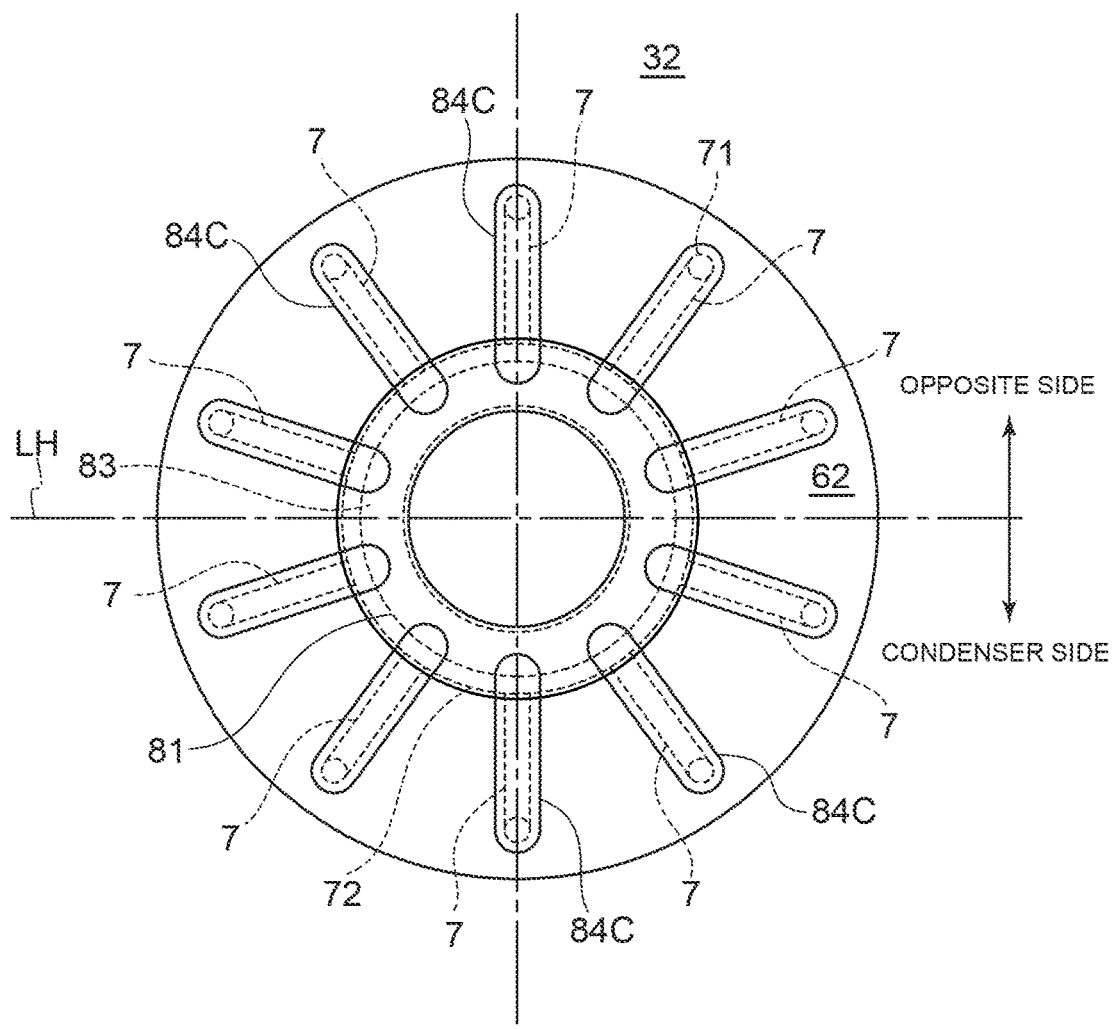
FIG. 11 is a schematic diagram for describing the bypass passage in FIG. 10, viewed from the axial direction.
Figure 12:
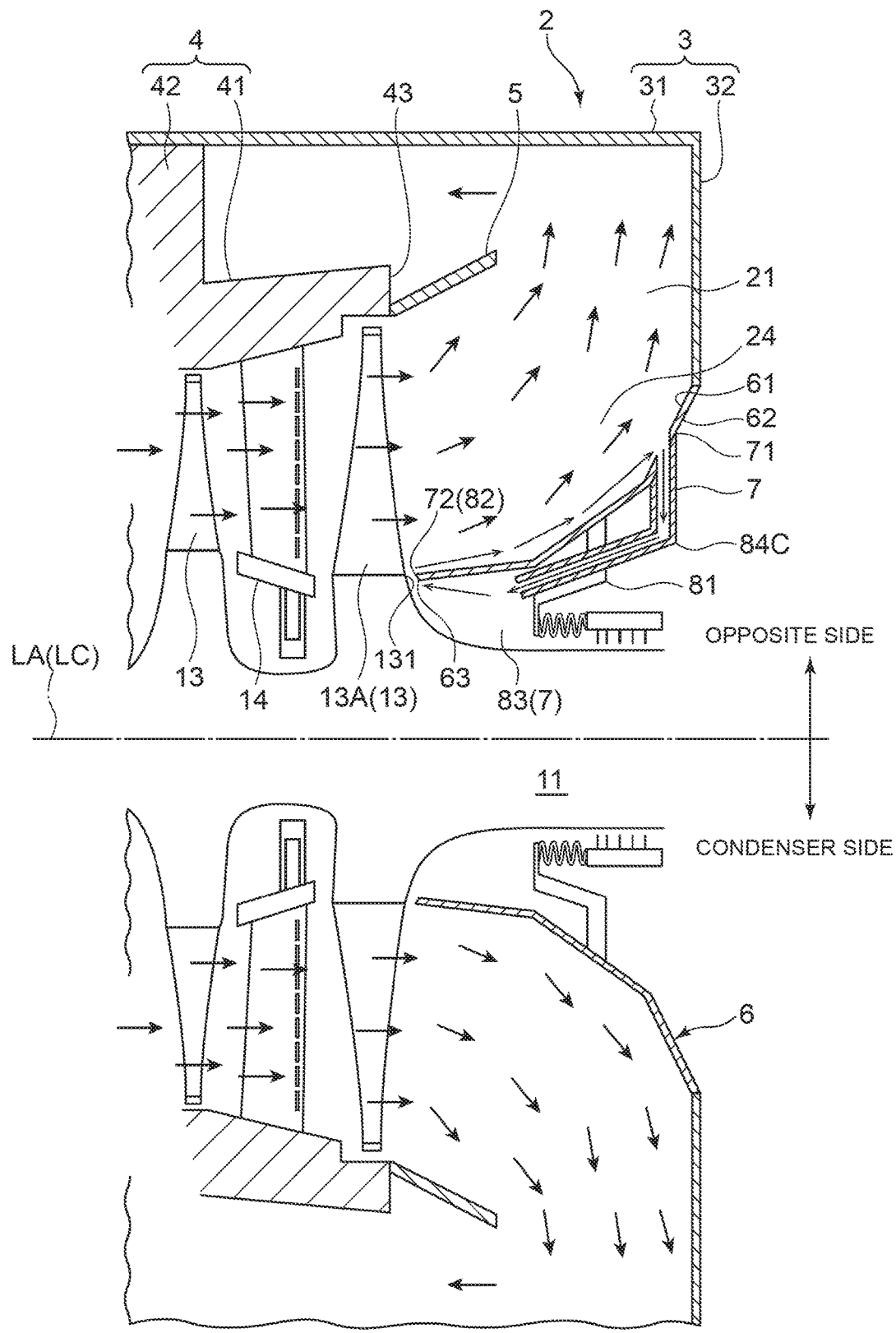
FIG. 12 is a cross-sectional view of an exhaust chamber of a steam turbine according to another embodiment of the present invention, taken along the axial direction, where a high-pressure-side opening is formed only on the opposite side.
Figure 13:
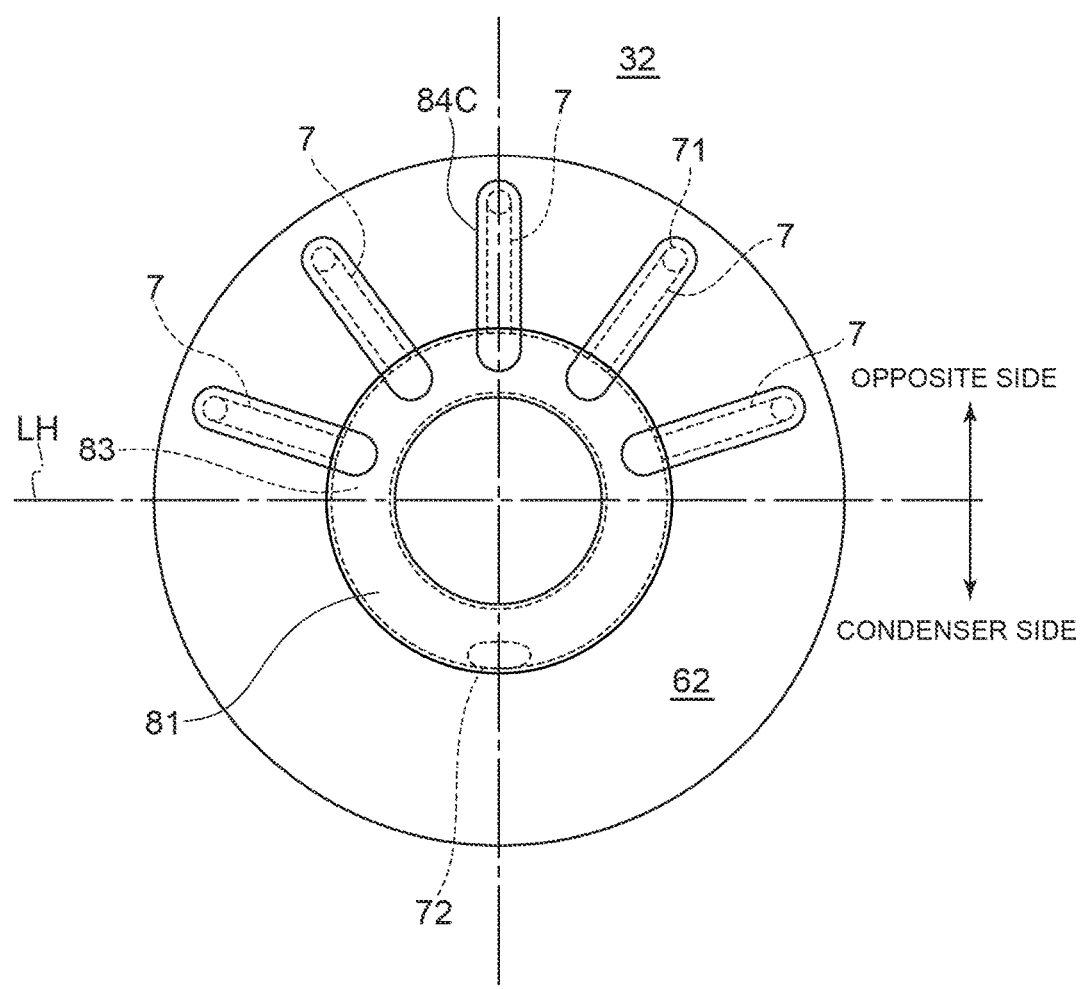
FIG. 13 is a schematic diagram for describing the bypass passage in FIG. 12, viewed from the axial direction.

FIG. 10 is a cross-sectional view of an exhaust chamber of a steam turbine according to another embodiment of the present invention, taken along the axial direction, where an axial end seal portion forms a low-pressure-side opening. FIG. 11 is a schematic diagram for describing the bypass passage in FIG. 10, viewed from the axial direction. FIG. 12 is a cross-sectional view of an exhaust chamber of a steam turbine according to another embodiment of the present invention, taken along the axial direction, where a high-pressure-side opening is formed only on the opposite side. FIG. 13 is a schematic diagram for describing the bypass passage in FIG. 12, viewed from the axial direction. In some embodiments, as shown in FIGS. 10 and 12, the above-described low-pressure-side opening 72 is an axial end seal portion 82 disposed upstream of the high-pressure-side opening 71 in the flow direction of the bearing cone 6 and is formed by a base portion 131 of the last-stage blade 13A and an upstream end 63 of the bearing cone 6 in the flow direction.

As shown in FIGS. 10 and 12, a second inner space 83 is formed between the seal member 81 and the base portion 131 of the last-stage blade 13A in the axial direction. The second inner space 83 is defined by the outer surface 62 of the bearing cone 6, the rotor 11, and the seal member 81. The second inner space 83 communicates with the exhaust passage 21 at a position upstream of the upstream end 63 of the bearing cone 6 via the axial end seal portion 82. In the embodiment shown in FIGS. 10 and 12, at least one bypass passage 7 is formed by a cylindrical pipe 84C and the second inner space 83. As shown in FIGS. 10 and 12, the pipe 84C has a first opening end connected to a downstream portion of the bearing cone 6 in the flow direction, so that a high-pressure-side opening 71 communicating with the exhaust passage 21 is formed in the downstream portion of the bearing cone 6. Further, as shown in FIGS. 10 and 12, the pipe 84C is bent midway and penetrates the seal member 81 and has a second opening end disposed inside the second inner space 83 so that the second opening end of the pipe 84C communicates with the second inner space 83. As shown in FIGS. 11 and 13, the pipe 84C extends along the radial direction when viewed from the axial direction of the exhaust chamber 2.

Further, the axial end seal portion 82 (low-pressure-side opening 72) may open annularly as shown in FIG. 11, or may be formed in a part of the circumference as shown in FIG. 13. The axial end seal portion 82 desirably opens only on the condenser side. In this case, the pressure difference between the low-pressure-side opening 72 and the highpressure-side opening 71 can be increased. This enables steam to efficiently flow into the bypass passage 7 from the high-pressure-side opening 71 of the bypass passage 7.

With the above configuration, since the axial end seal portion 82 is formed between the base portion 131 of the last-stage blade 13A and the upstream end 63 of the bearing cone 6 in the flow direction, steam in the vicinity of the axial end seal portion 82 has a lower pressure than steam facing the inner surface 61 on the upstream side of the bearing cone 6 in the flow direction. Thus, the pressure difference between the low-pressure-side opening 72 and the high-pressure-side opening 71 can be increased. This enables steam to efficiently flow from the high-pressure-side opening 71 of the bypass passage 7.

In some embodiments, as shown in FIGS. 12 and 13, when the exhaust chamber 2 of the steam turbine 10 is divided in the circumferential direction into the condenser side adjacent to the condenser 16 and the side opposite to the condenser side apart from the condenser 16, the high-pressure-side opening 71 of the bypass passage 7 is disposed on the opposite side.

As described above, steam flowing on the opposite side has a higher pressure than steam flowing on the condenser side, and thus steam facing the inner surface 61 of the bearing cone 6 on the opposite side is easily separated from the inner surface 61 of the bearing cone 6. With the above configuration, since the high-pressure-side opening 71 of the bypass passage 7 is formed on the opposite side, a part of steam facing the inner surface 61 of the bearing cone 6 on the opposite side flows from the high-pressure-side opening 71 toward the low-pressure-side opening 72. Thus, it is possible to form a forward flow FD along the inner surface 61 of the bearing cone 6 in the exhaust passage 21 on the opposite side. In particular, providing the high-pressure-side opening 71 of the bypass passage 7 only on the opposite side with a high pressure increases the pressure difference between the high-pressure-side opening 71 and the low-pressure-side opening 72. This enables steam to efficiently flow from the high-pressure-side opening 71 of the bypass passage 7.

FIG. 14 is a cross-sectional view of an exhaust chamber of a steam turbine according to another embodiment of the present invention, taken along the axial direction, where a casing forms at least a portion of a bypass passage. In some embodiments, as shown in FIG. 14, the above-described outer casing 3 (casing) further includes a third wall portion 33 (inner peripheral wall portion) disposed on the radially inner side of the bearing cone 6. At least a part of the bypass passage 7 is formed by the outer surface 62 of the bearing cone 6 and an inner surface 331 of the third wall portion 33.

As shown in FIG. 14, the outer casing 3 includes the outer peripheral wall portion 31 extending along the axial direction, the first wall portion 32 extending along the radial direction and having a radially outer end connected to an axially outer end of the outer peripheral wall portion 31, and the third wall portion 33 having a cylindrical shape so that a distance from the axis LA of the steam turbine 10 increases downward in the flow direction (outward in the axial direction) and having an axially outer end connected to a radially inner end of the first wall portion 32. Further, a downstream end of the bearing cone 6 in the flow direction is connected to an intermediate portion of the first wall portion 32.

Further, a third inner space 85 is formed between the inner surface 331 of the upstream end portion of the third wall portion 33 and the outer surface 62 of the bearing cone 6. As shown in FIG. 14, the third inner space 85 is defined by an inner surface 321 of the first wall portion 32 on the radially inner side of a junction between the first wall portion 32 and the bearing cone 6, the inner surface 331 of the third wall portion 33, and the outer surface 62 of the bearing cone 6. A seal for sealing the third inner space 85 is disposed between an upstream portion of the inner surface 331 of the third wall portion 33 and a portion of the outer surface 62 of the bearing cone 6 which faces the upstream portion, so that the second inner space 83 does not communicate with the third inner space 85.

As shown in FIG. 14, at least one bypass passage 7 is formed by a cylindrical pipe 84D, the third inner space 85, and a cylindrical pipe 84E. As shown in FIG. 14, the pipe 84D has a first opening end connected to a downstream portion of the bearing cone 6 in the flow direction, so that a high-pressure-side opening 71 communicating with the exhaust passage 21 is formed in the downstream portion of the bearing cone 6. Further, as shown in FIG. 14, the pipe 84D extends along the radial direction and has a second opening end disposed inside the third inner space 85 so that the second opening end of the pipe 84D communicates with the third inner space 85.

As shown in FIG. 14, the pipe 84E has a first opening end connected to an upstream portion of the bearing cone 6 in the flow direction, so that a low-pressure-side opening 72 communicating with the exhaust passage 21 is formed in the upstream portion of the bearing cone 6. Further, as shown in FIG. 14, the pipe 84E is bent midway and penetrates the seal between the upstream portion of the inner surface 331 of the third wall portion 33 and the portion of the outer surface 62 of the bearing cone 6 which faces the upstream portion, and has a second opening end disposed inside the third inner space 85 so that the second opening end of the pipe 84E communicates with the third inner space 85.

With the above configuration, since the bearing cone 6 serves as a lining of the third wall portion 33 of the outer casing 3, and the outer surface 62 and the inner surface 331 of the third wall portion 33 form at least a part of the bypass passage 7, it is possible to remove the bypass passage 7 by exchange or processing of the bearing cone 6 when the bypass passage 7 is not required.

Figure 15:
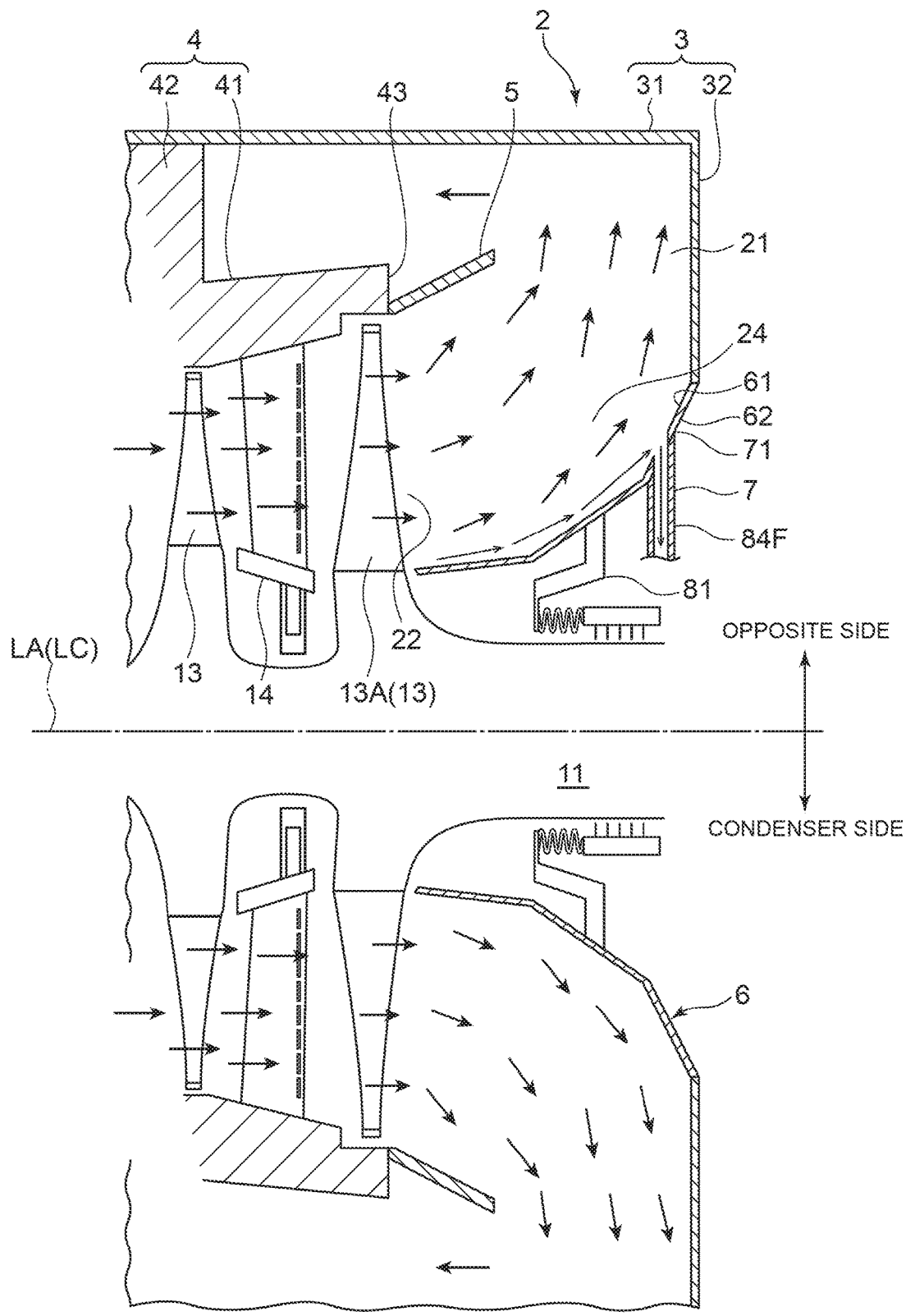
FIG. 15 is a cross-sectional view of an exhaust chamber of a steam turbine according to another embodiment of the present invention, taken along the axial direction, where a low-pressure-side opening is formed in a condenser.
Figure 16:
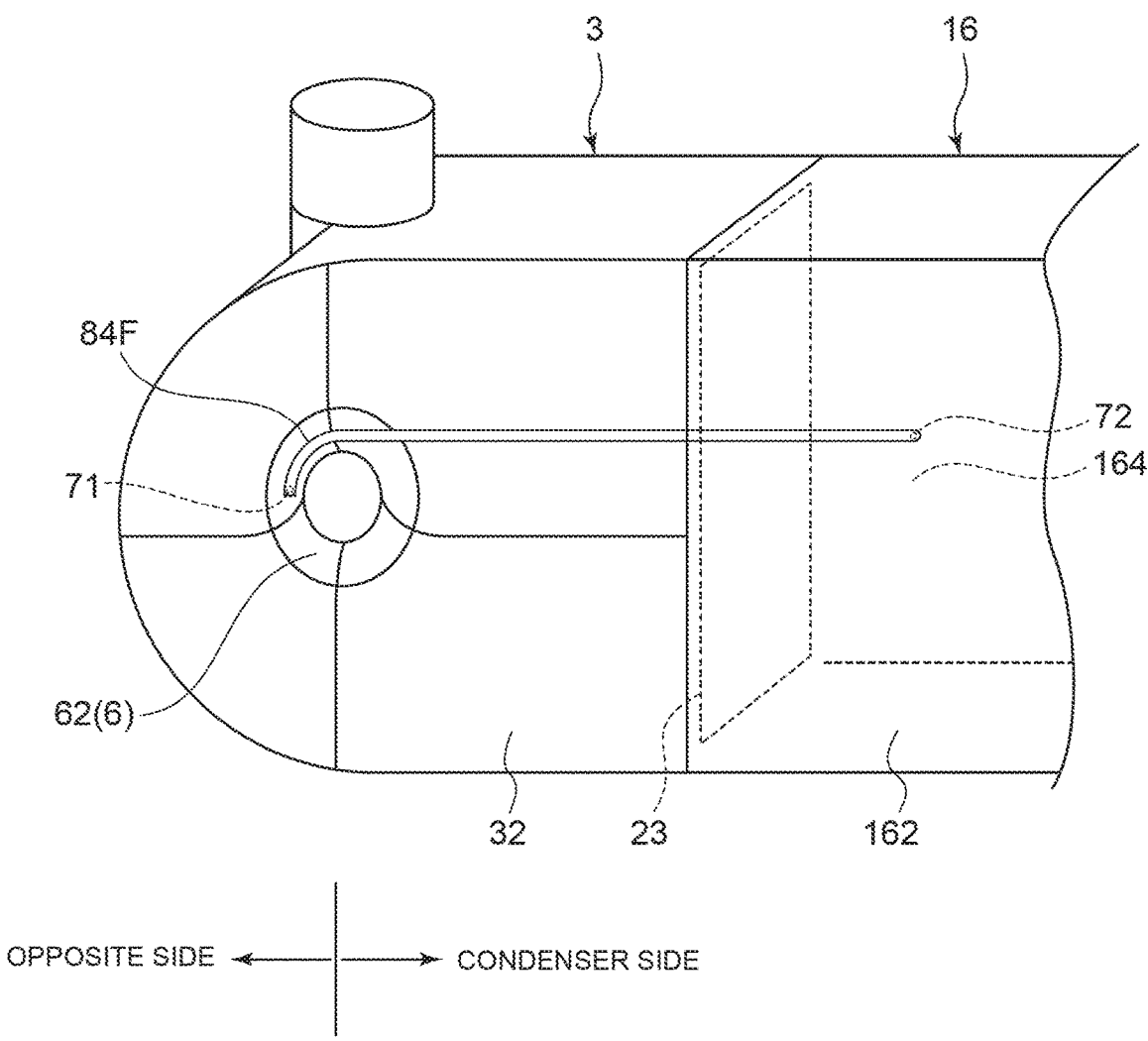
FIG. 16 is a schematic view of the condenser and the exhaust chamber of the steam turbine shown in FIG. 15, viewed from the axial direction.

FIG. 15 is a cross-sectional view of an exhaust chamber of a steam turbine according to another embodiment of the present invention, taken along the axial direction, where a low-pressure-side opening is formed in a condenser. FIG. 16 is a schematic view of the condenser and the exhaust chamber of the steam turbine shown in FIG. 15, viewed from the axial direction.

In some embodiments, as shown in FIGS. 15 and 16, the above-described low-pressure-side opening 72 is formed in the condenser 16. In the embodiment shown in FIGS. 15 and 16, the above-described condenser 16 is disposed beside the exhaust chamber 2. As described above, the condenser 16 includes a body 162 having a condenser inlet 161 through which steam enters from the exhaust chamber outlet 23 of the exhaust chamber 2, and a plurality of heat-transfer tubes (not shown) disposed inside the body 162.

As shown in FIGS. 15 and 16, at least one bypass passage 7 is formed by a cylindrical pipe 84F. As shown in FIGS. 15 and 16, the pipe 84F has a first opening end connected to a downstream portion of the bearing cone 6 in the flow direction on the opposite side, so that a high-pressure-side opening 71 communicating with the exhaust passage 21 is formed in the downstream portion of the bearing cone 6 on the opposite side. Further, as shown in FIG. 16, the pipe 84F has a second opening end connected the body 162 of the condenser 16 to form a low-pressure-side opening 72 communicating with an exhaust passage 164 within the body 162. The exhaust passage 164 communicates with the exhaust passage 21 of the exhaust chamber 2 via the condenser inlet 161.

In the above configuration, steam in the condenser 16 has a lower pressure than steam in the vicinity of the axial end seal portion 82 and than steam facing the inner surface 61 on the upstream side of the bearing cone 6 in the flow direction. Thus, the pressure difference between the low-pressure-side opening 72 and the high-pressure-side opening 71 can be increased. This enables steam to efficiently flow from the high-pressure-side opening 71 of the bypass passage 7.

Figure 17:
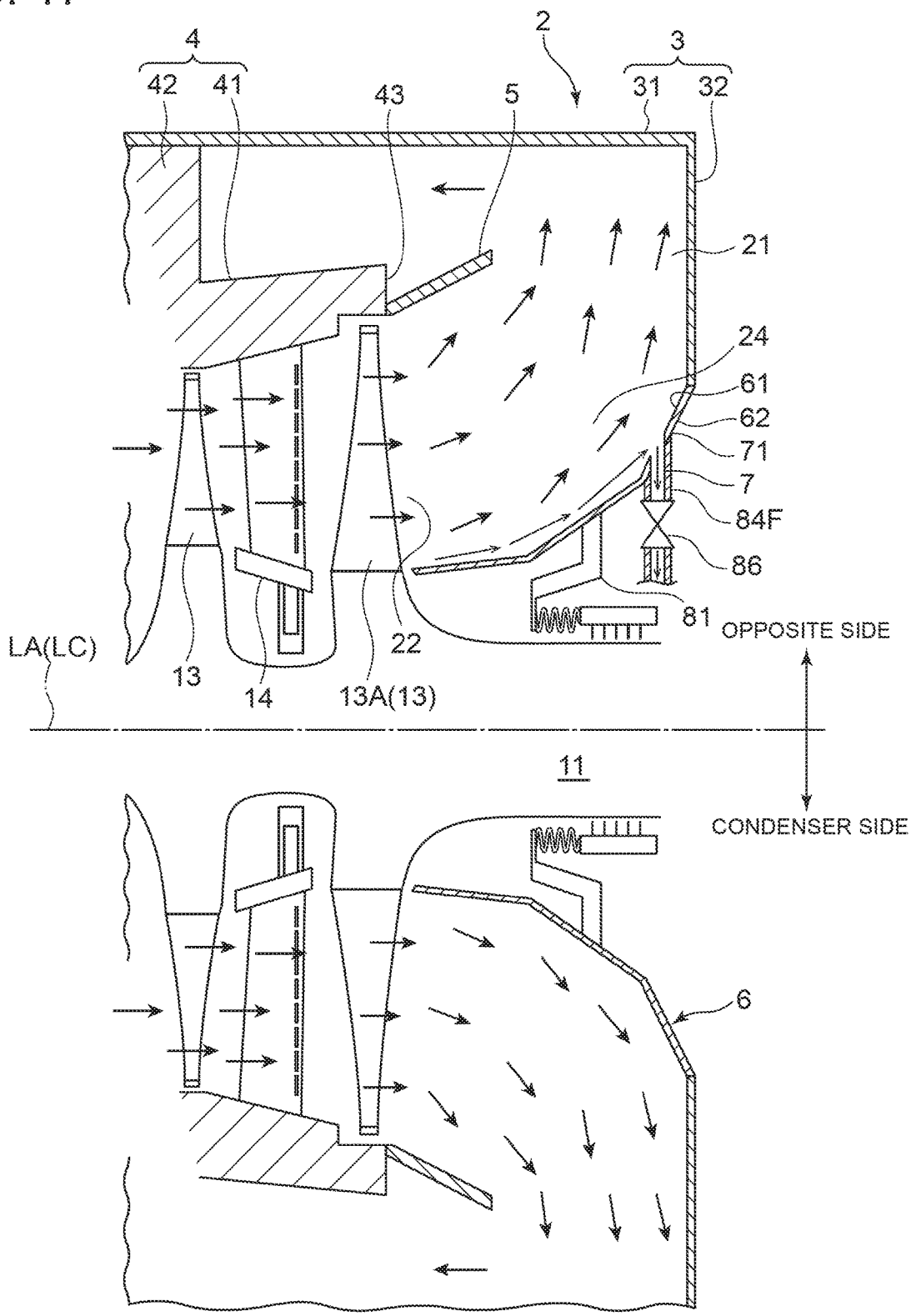
FIG. 17 is a cross-sectional view of an exhaust chamber of a steam turbine according to another embodiment of the present invention, taken along the axial direction, where a valve is disposed midway of a bypass passage.

FIG. 17 is a cross-sectional view of an exhaust chamber of a steam turbine according to another embodiment of the present invention, taken along the axial direction, where a valve is disposed midway of a bypass passage. In some embodiments, the exhaust chamber further includes a stop valve 86 for opening and closing the bypass passage 7. While in the embodiment shown in FIG. 17, the stop valve 86 is disposed on an intermediate portion of the pipe 84F, in other embodiments the stop valve 86 may be disposed on the pipe 84A to 84E. In particular, providing the stop valve 86 on the pipe 84A or the pipe 84C on the axially outer side of the seal member 81 makes it possible to easily operate the stop valve 86.

With the above configuration, in a case where steam facing the inner surface 61 of the bearing cone 6 is likely to separate, opening the stop valve 86 (increasing the degree of opening) causes a part of steam facing the inner surface 61 of the bearing cone 6 to flow through the bypass passage 7, which makes it possible to prevent separation of steam from the inner surface 61 of the bearing cone 6. Further, in a case where steam facing the inner surface 61 of the bearing cone 6 is not likely to separate, closing the stop valve 86 (decreasing the degree of opening) reduces fluid loss or pressure drop caused when a part of the steam flows through the bypass passage 7.

Figure 18:
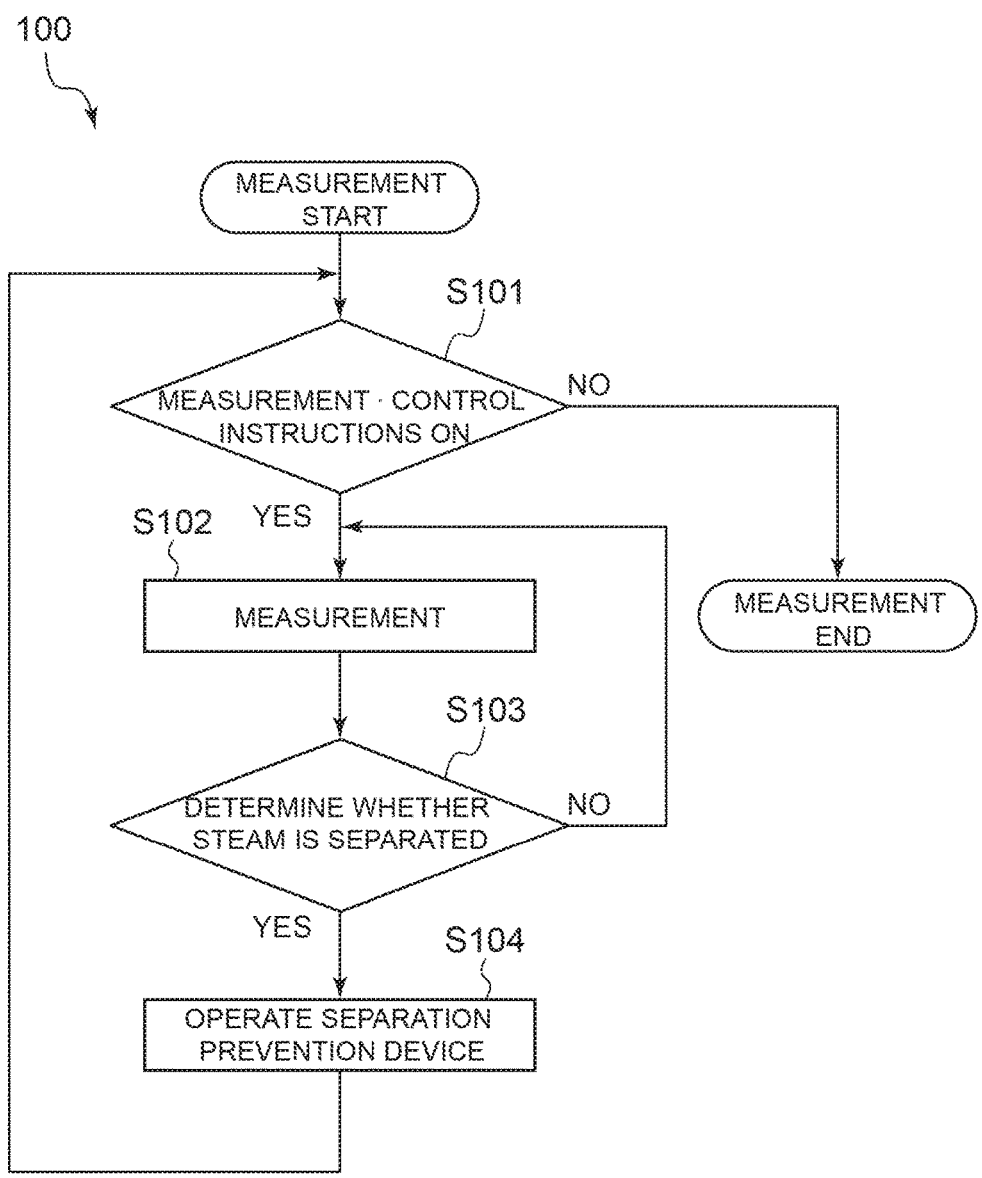
FIG. 18 is a flowchart showing a control example of a steam turbine system according to an embodiment of the present invention.

Next, with reference to FIGS. 18 and 26, configurations of a separation detection device 91 and a separation prevention device 92 according to some embodiments will be described specifically. FIG. 18 is a flowchart showing a control example of a steam turbine system according to an embodiment of the present invention. Embodiments regarding a separation detection device 91 and a separation prevention device 92 described below may be combined with the embodiments described above, or may be implemented alone.

As shown in FIG. 18, the steam turbine system 1 controls separation of steam flowing through the exhaust passage 21 by a separation prevention method 100 for steam flowing through the exhaust passage. As shown in FIG. 18, the separation prevention method 100 for steam flowing through the exhaust passage 21 includes: a step S101 of verifying an instruction for detecting separation of steam flowing through the exhaust passage 21; a measurement step S102 of performing measurement with a separation detection device 91; a determination step S103 of determining whether steam flowing through the exhaust passage 21 is separated, based on a measurement result in the measurement step S102; and a separation-prevention-device operation step S104 of operating a separation prevention device based on a detection result in the determination step S103.

In the step S101, if the instruction for detecting separation of steam is verified ("YES" in S101), the measurement step S102 is performed. In the step S101, if the instruction for detecting separation of steam is not verified ("NO" in S101), measurement ends. Further, in the determination step S103, if it is determined that steam flowing through the exhaust passage 21 is separated ("YES" in S103), the separation-prevention-device operation step S104 is performed. In the determination step S103, if it is determined that steam flowing through the exhaust passage 21 is not separated ("NO" in S103), measurement continues in the measurement step S102.

In some embodiments, the above-described steam turbine system 1 includes the above-described steam turbine 10 including the exhaust chamber 2, the above-described boiler 17, the above-described generator 18, and a separation detection device 91 for detecting separation of steam flowing through the exhaust passage 21.

Figure 19:
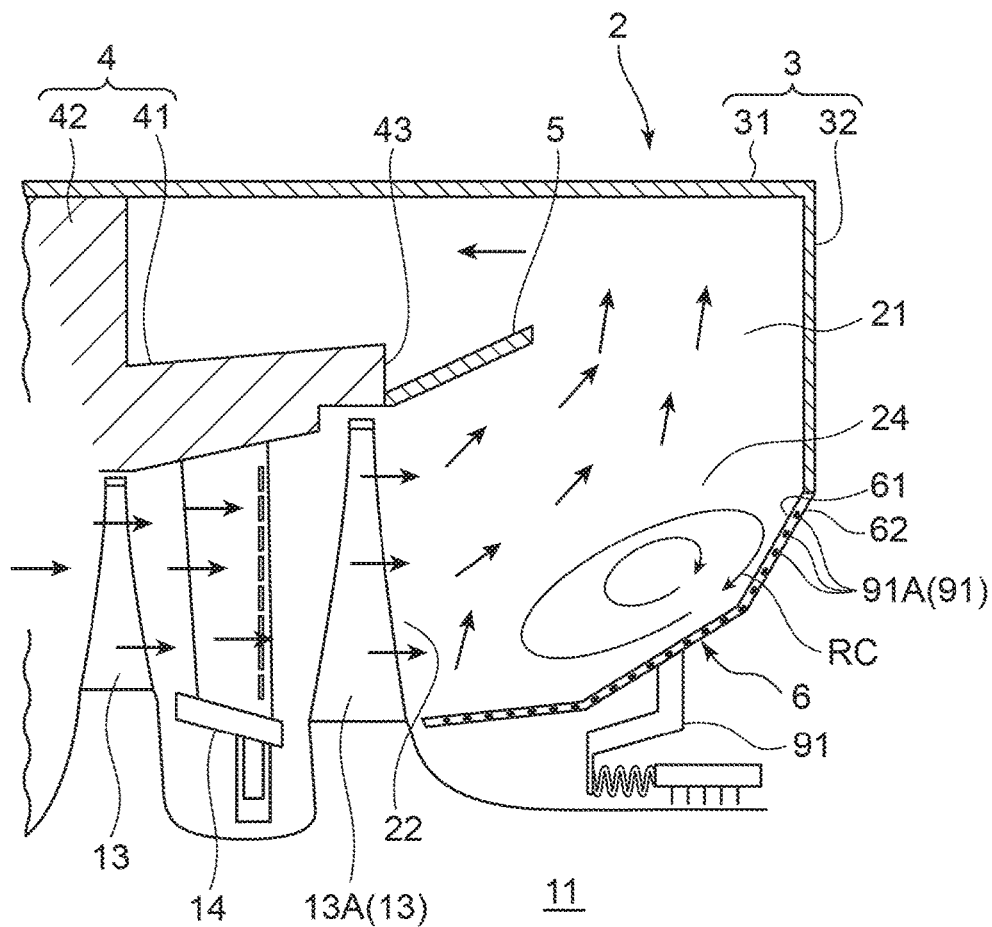
FIG. 19 is an enlarged cross-sectional view of a portion of an exhaust chamber of a steam turbine taken along the axial direction, for describing a separation detection device according to an embodiment of the present invention.

FIG. 19 is an enlarged cross-sectional view of a portion of an exhaust chamber of a steam turbine, taken along the axial direction, for describing a separation detection device according to an embodiment of the present invention. As shown in FIG. 19, the separation detection device 91 includes a pressure sensor 91A disposed on the inner surface 61 of the bearing cone 6. As shown in FIG. 19, the pressure sensor 91A detects the pressure of steam facing the inner surface 61 of the bearing cone 6. A plurality of pressure sensors 91A are arranged from upstream to downstream in the flow direction on the inner surface 61 of the bearing cone 6. With detection results of the pressure sensors 91A, it is possible to obtain pressure distribution in the flow direction of the inner surface 61 of the bearing cone 6.

Figure 20:
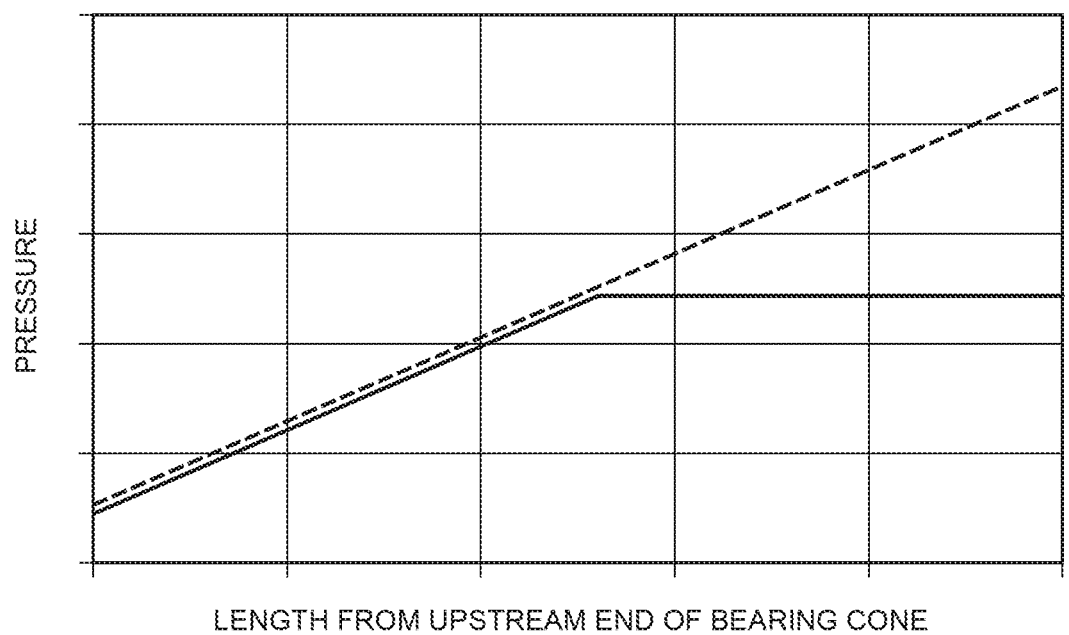
FIG. 20 is a graph showing a relationship between detected pressure and length of a bearing cone from an upstream end in the flow direction, for describing a method for detecting separation of steam by the separation detection device shown in FIG. 19.

FIG. 20 is a graph showing a relationship between detected pressure and length of a bearing cone from an upstream end in the flow direction, for describing a method for detecting separation of steam by the separation detection device shown in FIG. 19. In a case where steam is not separated from the inner surface 61 of the bearing cone 6, as indicated by the dotted line in FIG. 20, the pressure detected by the pressure sensor 91A increases as the length from the upstream end of the bearing cone 6 increases. In a case where steam is separated from the inner surface 61 of the bearing cone 6, as indicated by the solid line in FIG. 20, the pressure detected by the pressure sensor 91A does not increase (pressure is not recovered) even when the length from the upstream end of the bearing cone 6 increases.

With the above configuration, it is possible to detect separation of steam flowing through the exhaust passage 21 by the separation detection device 91. Thus, for instance, by controlling the steam turbine 10 or the boiler 17 of the steam turbine system 1 so that the separation detection device 91 does not detect separation, it is possible to reduce fluid loss in the exhaust chamber 2 and improve the efficiency of the steam turbine 10.

As described above, in some embodiments, the separation detection device 91 includes the pressure sensor 91A disposed on the inner surface 61 of the bearing cone 6.

With the above configuration, it is possible to detect the pressure of steam facing the inner surface 61 of the bearing cone 6 by the pressure sensor 91A. The pressure distribution in a case where steam is separated from the inner surface 61 of the bearing cone 6 differs from the pressure distribution in a case where steam is not separated. With this property, it is possible to detect separation of steam flowing through the exhaust passage 21 from the inner surface of the bearing cone 6 by the pressure sensor 91A.

Figure 21:
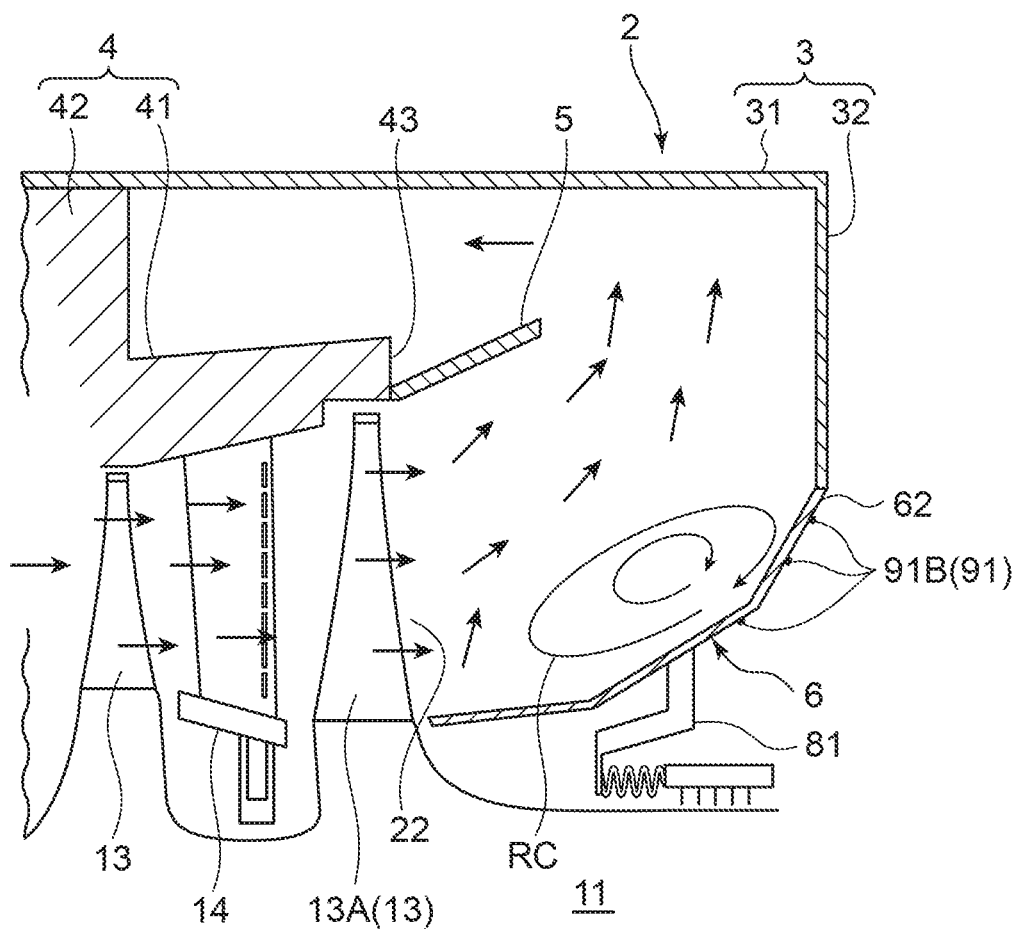
FIG. 21 is an enlarged cross-sectional view of a portion of an exhaust chamber of a steam turbine taken along the axial direction, for describing a separation detection device according to another embodiment of the present invention.

FIG. 21 is an enlarged cross-sectional view of a portion of an exhaust chamber of a steam turbine, taken along the axial direction, for describing a separation detection device according to another embodiment of the present invention. As shown in FIG. 21, in some embodiments, the separation detection device 91 includes a vibration detection device 91B disposed on the outer surface 62 of the bearing cone 6.

Figure 22:
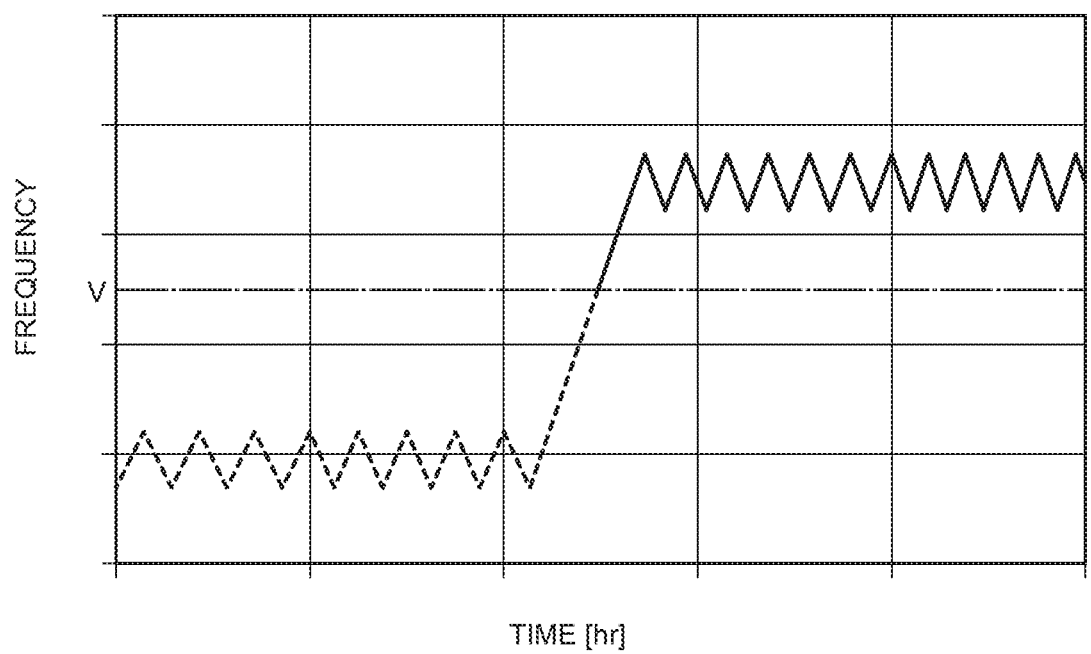
FIG. 22 is a graph showing frequency in a state where steam is separated and frequency in a state where steam is not separated, for describing a method for detecting separation of steam by the separation detection device shown in FIG. 21.

FIG. 22 is a graph showing frequency in a state where steam is separated and frequency in a state where steam is not separated, for describing a method for detecting separation of steam by the separation detection device shown in FIG. 21. In a case where steam is not separated from the inner surface 61 of the bearing cone 6, as indicated by the dotted line in FIG. 22, frequency detected by the vibration detection device 91B is smaller than normal frequency V. In a case where steam is separated from the inner surface 61 of the bearing cone 6, as indicated by the sold line in FIG. 22, frequency detected by the vibration detection device 91B is larger than normal frequency V.

With the above configuration, it is possible to detect vibration of the bearing cone 6 by the vibration detection device 91B. In a case where steam is separated from the inner surface 61 of the bearing cone 6, the flow of steam facing the inner surface 61 of the bearing cone 6 becomes turbulent, and the bearing cone 6 largely vibrates, compared with a case where steam is not separated. With this property, it is possible to detect separation of steam flowing through the exhaust passage 21 from the inner surface 61 of the bearing cone 6 by the vibration detection device 91B. Further, the vibration detection device 91B can be provided on the outer surface 62 of the bearing cone 6, in contract to the pressure sensor 91A which is disposed on the inner surface 61 of the bearing cone 6. Thus, the vibration detection device 91B is easy to install.

Figure 23:
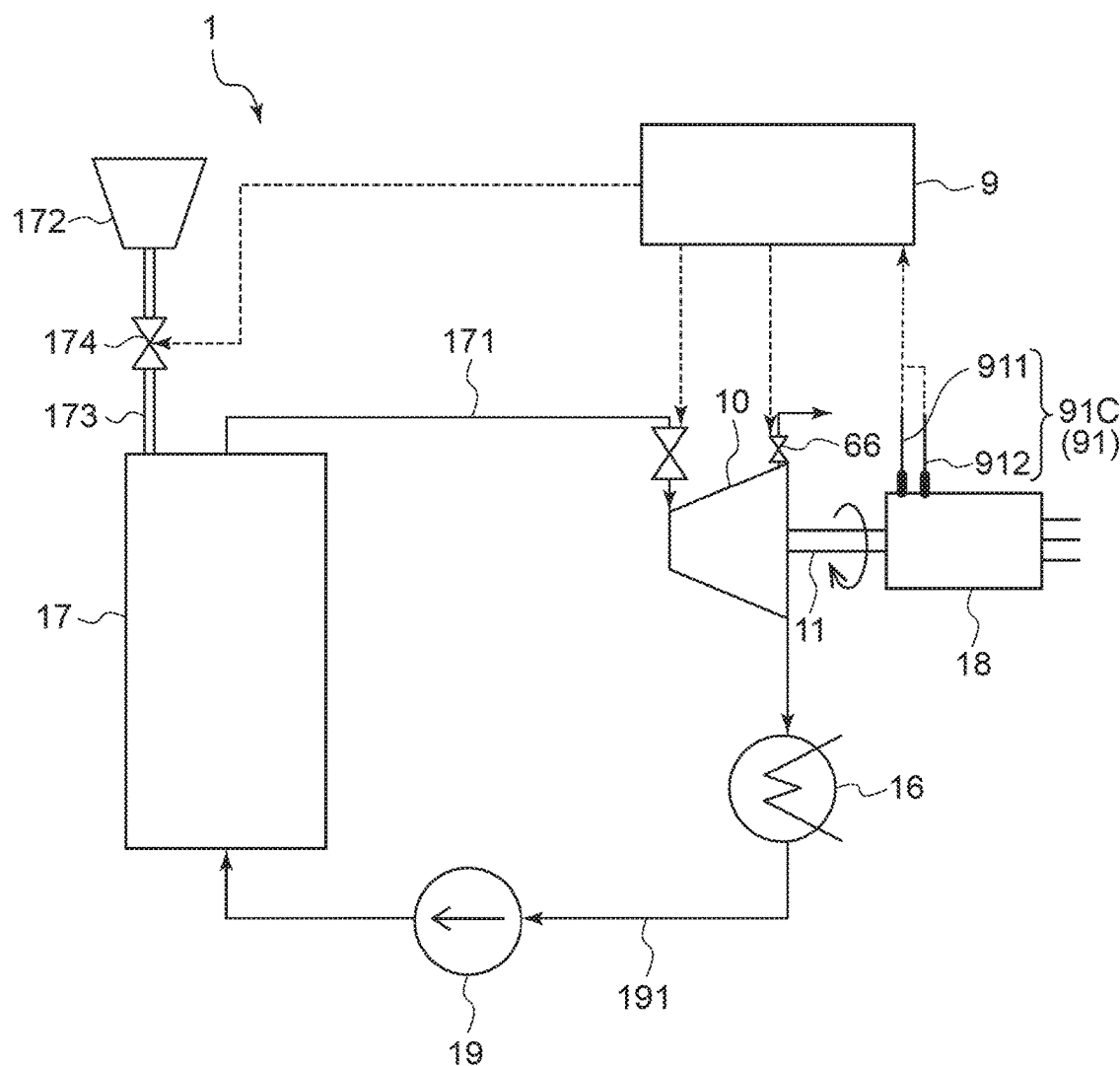
FIG. 23 is a schematic configuration diagram showing another configuration of a steam turbine plant, for describing a separation detection device and a separation prevention device according to an embodiment of the present invention.
Figure 24:
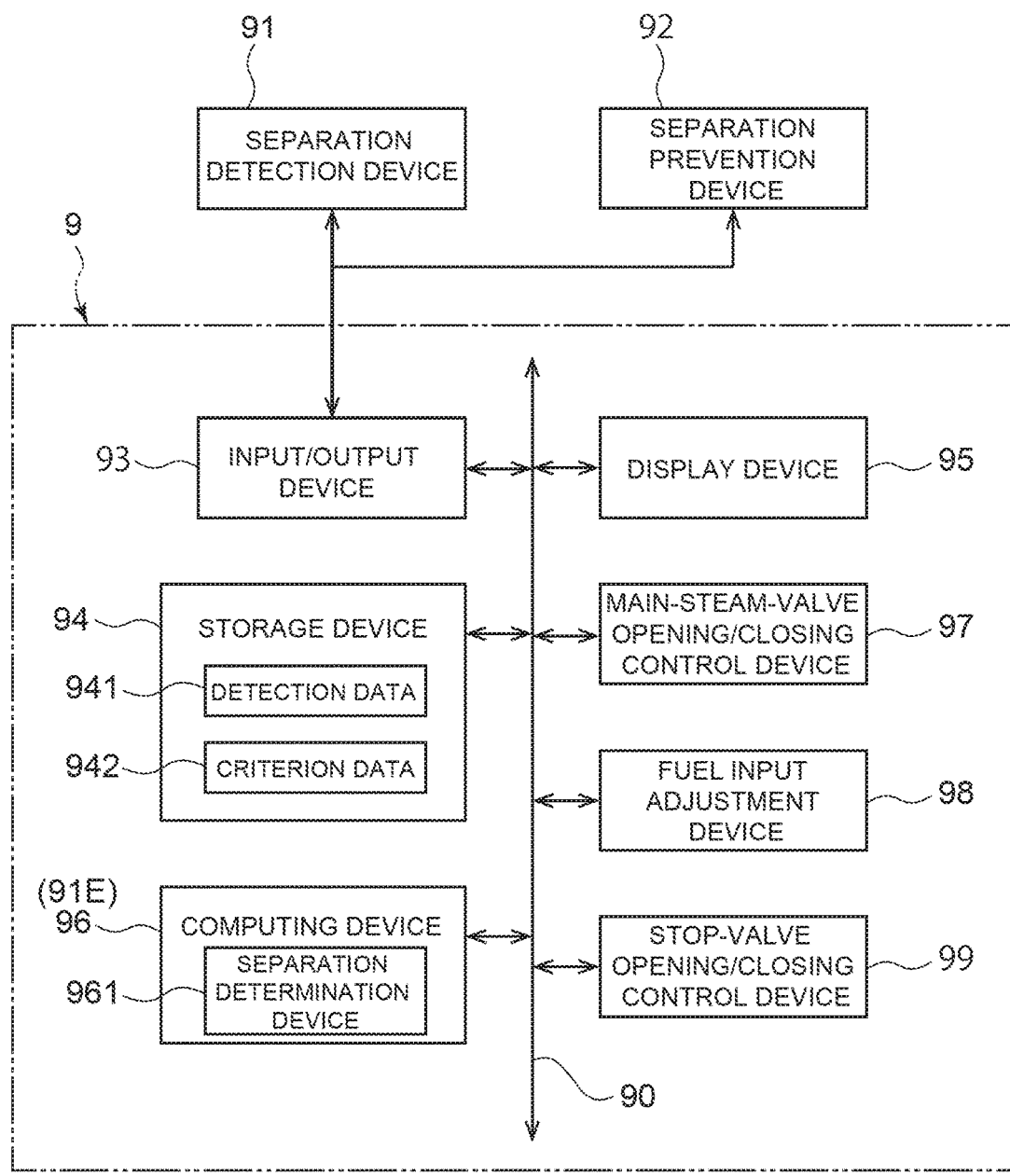
FIG. 24 is a configuration diagram showing a configuration example of a control device according to one embodiment of the present invention.

FIG. 23 is a schematic configuration diagram showing another configuration of a steam turbine plant, for describing a separation detection device and a separation prevention device according to an embodiment of the present invention. FIG. 24 is a configuration diagram showing a configuration example of a control device according to one embodiment of the present invention. In some embodiments, as shown in FIG. 23, the above-described separation detection device 91 includes an output detection device 91C for detecting the output power of the generator 18. As shown in FIG. 23, the output detection device 91C includes a voltmeter 911 and an ammeter 912 each disposed on the generator 18 and calculates electric power (output power) which is the product of voltage measured by the voltmeter 911 and current measured by the ammeter 912.

As shown in FIG. 23, the above-described steam turbine system 1 further includes a controller 9. The voltmeter 911 and the ammeter 912 are electrically connected to the controller 9 so as to send measurement results to the controller 9. As shown in FIG. 24, the controller 9 is composed of a microcomputer including an input/output device 93 (input/output interface), a storage device 94 (ROM, RAM), a display device 95 (display), and a computing device 96. General configuration and control are omitted for clarity. The input/output device 93, the storage device 94, the display device 95, and the computing device 96 are each electrically connected to a bus 90, so that signals and image data are transmittable and receivable between the devices.

The input/output device 93 of the controller 9 receives various information from components (e.g., steam turbine 10) of the steam turbine system 1, the separation detection device 91, and the separation prevention device 92, and transmits various data based on calculation results or the like to the components. The input/output device 93 includes a keyboard and a mouse. The storage device 94 is configured to store various input information, calculation results, and various programs necessary for control. Further, the storage device 94 stores detection data 941 measured and detected by the separation detection device 91 in the measurement step S102. The computing device 96 performs processing based on the various information described above. The display device 95 displays the input information and information such as calculation results obtained by the computing device 96. Calculation of electric power by the output detection device 91C may be performed by the computing device 96.

With the above configuration, it is possible to detect the output power of the generator 18 by the output detection device 91C. In a case where steam is separated from the flow guide 5 or the bearing cone 6, the efficiency of the steam turbine 10 decreases, and the output power of the steam turbine 10 and the output power of the generator 18 decrease, compared with a case where steam is not separated. With this property, it is possible to detect separation of steam flowing through the exhaust passage 21 by the output detection device 91C. Further, the generator 18 is generally equipped with the output detection device 91C, and thus eliminates the necessity of an additional device for detecting separation of steam. Thus, it is possible to prevent complication of the system configuration.

Figure 25:
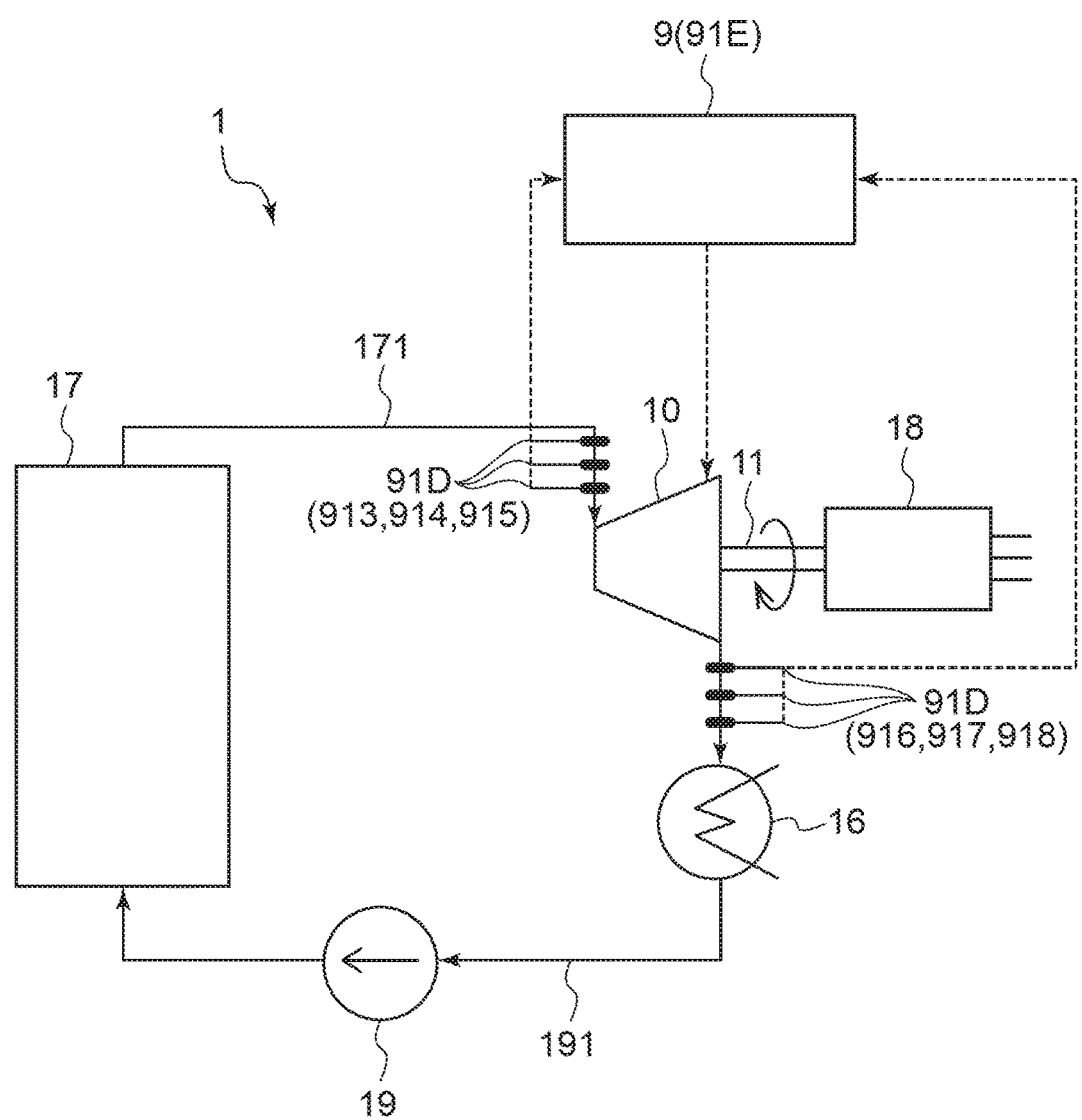
FIG. 25 is a schematic configuration diagram showing another configuration of a steam turbine plant, for describing a separation detection device according to an embodiment of the present invention.

FIG. 25 is a schematic configuration diagram showing another configuration of a steam turbine plant, for describing a separation detection device according to an embodiment of the present invention. In some embodiments, the above-described separation detection device 91 includes a calculation device 91E for calculating the efficiency of the steam turbine 10 based on a measurement result of a measurement tool 91D provided to the steam turbine system 1.

The measurement tool 91D is generally disposed on the steam turbine 10 and includes a first pressure gauge 913 for measuring the pressure of steam at the steam inlet 15 of the steam turbine 10, a first thermometer 914 for measuring the temperature of steam at the steam inlet 15 of the steam turbine 10, a first flow meter 915 for measuring the flow rate of steam at the steam inlet 15, a second pressure gauge 916 for measuring the pressure of steam at the exhaust chamber outlet 23 or the condenser inlet 161, a second thermometer 917 for measuring the temperature of steam at the exhaust chamber outlet 23 or the condenser inlet 161, and a second flow meter 918 for measuring the flow rate of steam at the exhaust chamber outlet 23 or the condenser inlet 161, as shown in FIG. 25. The measurement tool 91D is electrically connected to the controller 9 so as to send a measurement result to the controller 9.

Further, the calculation device 91E calculates the pressure difference based on detection values of the first pressure gauge 913 and the second pressure gauge 916, the temperature difference based on detection values of the first thermometer 914 and the second thermometer 917, and the flow rate difference based on detection values of the first flow meter 915 and the second flow meter 918, multiplies the pressure difference, the temperature difference, and the flow rate difference together to calculate the work of the steam turbine 10, and calculates the efficiency of the steam turbine 10 based on the work. The calculation device 91E may be the computing device 96, as shown in FIG. 24.

With the above configuration, using the calculation device 91E, it is possible to calculate the efficiency of the steam turbine 10 based on measurement results of the measurement tool 91D disposed on the steam turbine system 1. As described above, in a case where steam is separated from the flow guide 5 or the bearing cone 6, the efficiency of the steam turbine 10 decreases, and the output power of the steam turbine 10 and the output power of the generator 18 decrease, compared with a case where steam is not separated. With this property, it is possible to detect separation of steam flowing through the exhaust passage 21 by the calculation device 91E. Further, use of the measurement tool 91D generally disposed on the steam turbine 10 eliminates the necessity of an additional device for detecting separation of steam. Thus, it is possible to prevent complication of the system configuration.

In some embodiments, the above-described steam turbine system 1 includes the storage device 94 which stores criterion data 942 indicating a separation state and a non-separation state of steam flowing through the exhaust passage 21 obtained by computational fluid analysis, and a separation determination device 961 which determines whether steam flowing through the exhaust passage 21 is separated, based on a detection result (detection data 941) of the separation detection device 91 and the criterion data 942.

Figure 26:
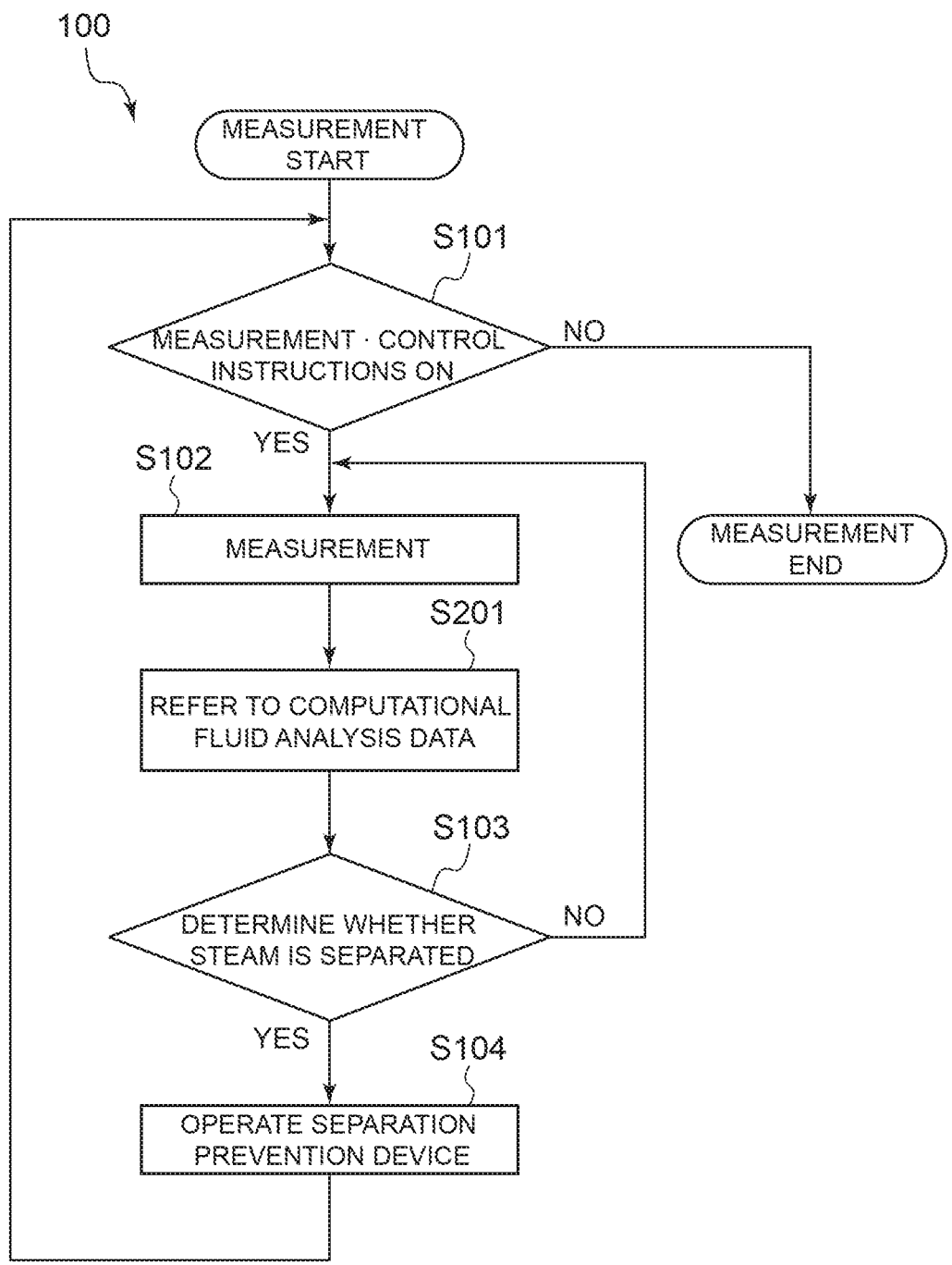
FIG. 26 is a flowchart showing another control example of a steam turbine system according to an embodiment of the present invention.

FIG. 26 is a flowchart showing another control example of a steam turbine system according to an embodiment of the present invention. As shown in FIG. 26, the above-described separation prevention method 100 for steam flowing through the exhaust passage 21 further includes, after the measurement step S102 and before the determination step S103, a criterion-data reference step S201. In the criterion-data reference step S201, the criterion data 942 stored in the storage device 94 is referred to.

The criterion data 942 is data indicating a separation state and a non-separation state of steam flowing through the exhaust passage 21 for every operational condition of the steam turbine 10 obtained by computational fluid analysis, and serves as a criterion to determine whether steam is in the separation state or in the non-separation state. More specifically, the criterion data 942 includes pressure distribution when steam facing the bearing cone 6 is in the separation state and pressure distribution when the steam is in the non-separation state. Additionally, the criterion data 942 includes frequency when steam facing the bearing cone 6 is in the separation state, frequency when the steam is in the non-separation state, and normal frequency for determining the separation state. Additionally, the criterion data 942 includes the efficiency and the work of the steam turbine 10 for every operational condition of the steam turbine 10 and the output power of the generator 18 for every operational condition of the steam turbine 10.

In the determination step S103, the criterion data 942 obtained by computational fluid analysis is compared with a measurement result (detection data 941) in the measurement step S102 to determine whether steam flowing through the exhaust passage 21 is separated or not.

The separation determination device 961 may be included in the computing device 96 of the controller 9, as shown in FIG. 24. The separation determination device 961 performs the criterion-data reference step S201 and the determination step S103. In some embodiments, the separation determination device 961 may perform the determination step S103 without reference to the criterion data 942.

With the above configuration, using the criterion data 942 obtained by computational fluid analysis stored in the storage device 94, it is possible to accurately detect separation of steam. Thus, even in a case where some separation detection devices 91 such as the pressure sensor 91A are broken, it is possible to detect separation of steam. Further, it is possible to reduce the number of the separation detection devices 91 while keeping detection accuracy regarding separation of steam.

In some embodiments, the above-described steam turbine system 1 includes a separation prevention device 92 for preventing separation of steam flowing through the exhaust passage 21. The separation prevention device 92 includes a controller 9 which controls the opening and closing operation of a main steam valve 101 of the steam turbine 10 or adjusts the input amount of fuel input to the boiler 17, based on a detection result by the separation detection device 91.

As shown in FIG. 24, the controller 9 further includes a main-steam-valve opening/closing control device 97 which controls the opening and closing operation of the main steam valve 101 of the steam turbine 10 and a fuel input adjustment device 98 which adjusts the input amount of fuel input to the boiler 17.

As shown in FIG. 23, the main steam valve 101 is electrically connected to the controller 9. The main steam valve 101 is disposed on a downstream portion of the steam inlet line 171 and configured to adjust the flow rate of steam (main steam) flowing from the boiler 17 via the steam inlet line 171 to the steam turbine 10 by control of the main-steam-valve opening/closing control device 97.

As shown in FIG. 23, the fuel to be input to the boiler 17 is stored in a fuel storage device 172 disposed upstream of the boiler 17. The boiler 17 and the fuel storage device 172 are connected with a fuel supply line 173. In the middle of the fuel supply line 173, a fuel supply amount adjustment valve 174 is disposed. The fuel supply amount adjustment valve 174 is electrically connected to the controller 9. The fuel supply amount adjustment valve 174 is configured to adjust the amount of fuel input to the boiler 17 from the fuel storage device 172 via the fuel supply line 173 by control of the fuel input adjustment device 98.

With the above configuration, in a case where separation of steam flowing through the exhaust passage 21 is detected, the controller 9 opens the main steam valve 101 of the steam turbine 10 (increases the opening degree) or increases the amount of fuel to be input to the boiler compared to during normal operation so that the main steam flow rate of the steam turbine 10 temporarily increases. When the main steam flow rate of the steam turbine 10 increases, steam flows into the exhaust passage at a high flow rate, and thus steam flowing in the vicinity of the bearing cone 6 adheres to the inner surface 61 of the bearing cone 6. Thus, it is possible to prevent separation of steam flowing through the exhaust passage 21. Further, in a case where separation of steam flowing through the exhaust passage 21 is not detected, the controller 9 closes the main steam valve 101 of the steam turbine 10 (decreases the opening degree) or decreases the amount of fuel to be input to the boiler 17 compared to a case where separation of steam is detected, so that the combustion efficiency of the steam turbine 10 is improved. The adjustment of the input amount to the boiler 17 is more effective in increasing the main steam flow rate of the steam turbine 10 over a prolonged period, than the opening and closing operation of the main steam valve 101.

Further, separation of steam is affected by preceding operational conditions. For instance, if the turbine enters normal operation after steam is separated under an operational condition with low flow rate or low vacuum, steam is kept in the separation state; in contrast, if the turbine enters normal operation after steam adheres to the inner surface 61 of the bearing cone 6 under an operational condition with high flow rate or high vacuum, steam is kept in the non-separation state. Using this property, the controller 9 can close the main steam valve 101 of the steam turbine 10 (decreases the opening degree) or decrease the amount of fuel to be input to the boiler 17 so that the combustion efficiency of the steam turbine 10 is improved.

In some embodiments, the above-described steam turbine system 1 includes a separation prevention device 92 for preventing separation of steam flowing through the exhaust passage 21. The separation prevention device 92 includes a controller 9 which controls the opening and closing operation of the stop valve 86 for opening and closing the bypass passage 7.

As shown in FIG. 24, the controller 9 further includes a stop-valve opening/closing control device 99 which controls the opening and closing operation of the stop valve 86. Further, as shown in FIG. 23, the stop valve 86 is electrically connected to the controller 9. The stop valve 86 is configured to adjust the flow rate of steam flowing through the bypass passage 7 by control of the stop-valve opening/closing control device 99.

With the above configuration, in a case where separation of steam flowing through the exhaust passage 21 is detected, the controller 9 opens the stop valve 86 for opening and closing the bypass passage 7 (increases the degree of opening) to cause a part of steam facing the inner surface 61 of the bearing cone 6 to flow through the bypass passage 7, which makes it possible to prevent separation of steam from the inner surface 61 of the bearing cone 6. Further, in a case where separation of steam flowing through the exhaust passage 21 is not detected, the controller 9 closes the stop valve 86 (decreases the degree of opening) to reduce fluid loss or pressure drop caused when a part of the steam flows through the bypass passage 7.

Embodiments of the present invention were described in detail above, but the present invention is not limited thereto, and various amendments and modifications may be implemented.

The invention claimed is:

1. A steam turbine exhaust chamber defining therein an exhaust passage through which steam having passed through a last-stage blade of a steam turbine is introduced to a condenser, the steam turbine exhaust chamber comprising:
   a casing including an outer peripheral wall portion formed on an outer peripheral side of the exhaust passage;
   a bearing cone disposed on a radially inner side of the outer peripheral wall portion; and
   at least one bypass passage carrying a part of steam flowing through the exhaust passage from a high-pressure portion of the exhaust passage to a low-pressure portion of the exhaust passage or to the condenser,
   wherein the at least one bypass passage is formed along an outer surface of the bearing cone, the outer surface of the bearing cone facing opposite to the outer peripheral wall portion, and
   wherein the at least one bypass passage includes a high-pressure-side opening communicating with the exhaust passage on an opposite-condenser side and a low-pressure-side opening communicating with the exhaust passage on the condenser side, the opposite-condenser side being opposite to the condenser side.

2. The steam turbine exhaust chamber according to claim 1,
   wherein the high-pressure-side opening communicates with the exhaust passage in a downstream portion of the bearing cone and the low-pressure-side opening communicates with the exhaust passage in an upstream portion of the bearing cone
   wherein when the steam turbine exhaust chamber is divided in a circumferential direction, the condenser side is adjacent to the condenser and the opposite-condenser side is a side opposite to the condenser side apart from the condenser.

3. The steam turbine exhaust chamber according to claim 1,
   wherein the low-pressure-side opening is an axial end seal portion disposed upstream of the high-pressure-side opening in a flow direction of the bearing cone, and the axial end seal portion is formed between a base portion of the last-stage blade and an upstream end of the bearing cone in the flow direction.

4. The steam turbine exhaust chamber according to claim 3,
   wherein when the steam turbine exhaust chamber is divided in a circumferential direction, the condenser side is a side adjacent to the condenser and the opposite-condenser side is a side opposite to the condenser side apart from the condenser.

5. The steam turbine exhaust chamber according to claim 1,
   wherein the casing further includes an inner peripheral wall portion disposed on a radially inner side of the bearing cone, and
   wherein at least a part of the at least one bypass passage is formed by the outer surface of the bearing cone and an inner surface of the inner peripheral wall portion.

6. The steam turbine exhaust chamber according to claim 1,
   wherein the low-pressure-side opening is formed in the condenser.

7. The steam turbine exhaust chamber according to claim 1, further comprising a stop valve for opening and closing the at least one bypass passage.

8. A steam turbine system comprising:
   a steam turbine including the steam turbine exhaust chamber according to claim 1;
   a boiler for combusting a fuel to generate steam;
   a generator for generating electric power by the steam turbine; and
   a separation detection device for detecting separation of steam flowing through the exhaust passage.

9. The steam turbine system according to claim 8,
   wherein the separation detection device includes a pressure sensor disposed on an inner surface of the bearing cone.

10. The steam turbine system according to claim 8,
    wherein the separation detection device includes a vibration detection device disposed on the outer surface of the bearing cone.

11. The steam turbine system according to claim 8,
    wherein the separation detection device includes an output detection device for detecting an output power of the generator.

12. The steam turbine system according to claim 8,
    wherein the separation detection device includes a calculation device for calculating efficiency of the steam turbine based on a measurement result of a measurement tool provided to the steam turbine system.

13. The steam turbine system according to claim 8 further comprising:
    a storage device storing criterion data indicating a separation state and a non-separation state of the steam flowing through the exhaust passage obtained by computational fluid analysis; and
    a separation determination device determining whether the steam flowing through the exhaust passage is separated, based on the criterion data and a detection result of the separation detection device.

14. The steam turbine system according to claim 8 further comprising a separation prevention device for preventing separation of the steam flowing through the exhaust passage,
    wherein the separation prevention device includes a controller for controlling an opening and closing operation of a main steam valve of the steam turbine or adjusting an amount of a fuel to be input to the boiler, based on a detection result of the separation detection device.

15. The steam turbine system according to claim 8 further comprising a separation prevention device for preventing separation of the steam flowing through the exhaust passage,
    wherein the separation prevention device includes a controller for controlling an opening and closing operation of a stop valve for opening and closing the at least one bypass passage.

16. A steam turbine exhaust chamber defining therein an exhaust passage through which steam having passed through a last-stage blade of a steam turbine is introduced to a condenser, the steam turbine exhaust chamber comprising:
    a casing including an outer peripheral wall portion formed on an outer peripheral side of the exhaust passage;
    a bearing cone disposed on a radially inner side of the outer peripheral wall portion; and
    at least one bypass passage carrying a part of steam flowing through the exhaust passage from a high-pressure portion of the exhaust passage to a low-pressure portion of the exhaust passage or to the condenser,
    wherein the at least one bypass passage includes a high-pressure-side opening communicating with the exhaust passage on an opposite-condenser side and a low-pressure-side opening communicating with the exhaust passage on the condenser side when the steam turbine exhaust chamber is divided in a circumferential direction into the condenser side adjacent to the condenser and the opposite-condenser side opposite to the condenser side apart from the condenser, and
    wherein the high-pressure-side opening communicates with the exhaust passage in a downstream portion of the bearing cone and the low-pressure-side opening communicates with the exhaust passage in an upstream portion of the bearing cone.

17. A steam turbine exhaust chamber defining therein an exhaust passage through which steam having passed through a last-stage blade of a steam turbine is introduced to a condenser, the steam turbine exhaust chamber comprising:
    a casing including an outer peripheral wall portion formed on an outer peripheral side of the exhaust passage;
    a bearing cone disposed on a radially inner side of the outer peripheral wall portion; and
    at least one bypass passage carrying a part of steam flowing through the exhaust passage from a high-pressure portion of the exhaust passage to a low-pressure portion of the exhaust passage or to the condenser,
    wherein the at least one bypass passage includes a high-pressure-side opening communicating with the exhaust passage on an opposite-condenser side and a low-pressure-side opening communicating with the exhaust passage on the condenser side, the opposite-condenser side being opposite to the condenser side, and
    wherein the low-pressure-side opening is an axial end seal portion disposed upstream of the high-pressure-side opening in a flow direction of the bearing cone, and the axial end seal portion is formed between a base portion of the last-stage blade and an upstream end of the bearing cone in the flow direction.

* * * * *